(12) United States Patent
Khorramshahi et al.

(10) Patent No.: US 12,738,045 B2
(45) Date of Patent: Sep. 15, 2026

(54) USE OF A MACHINE LEARNING MODEL TO UPDATE ANOTHER MACHINE LEARNING MODEL

(71) Applicant: QUALCOMM Incorporated, San Diego, CA (US)

(72) Inventors: Pirazh Khorramshahi, San Diego, CA (US); Upal Mahbub, Santee, CA (US); Adithya Reddy Nallabolu, San Diego, CA (US); Gokce Dane, San Diego, CA (US); Vikram Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/545,871

(22) Filed: Dec. 19, 2023

(65) Prior Publication Data

US 2025/0200959 A1 Jun. 19, 2025

(51) Int. Cl.
*G06V 10/82* (2022.01)
*G06V 10/70* (2022.01)
*G06V 10/74* (2022.01)

(52) U.S. Cl.
CPC ............ *G06V 10/82* (2022.01); *G06V 10/761* (2022.01); *G06V 10/768* (2022.01)

(58) Field of Classification Search
CPC .... G06V 10/82; G06V 10/761; G06V 10/768; G06N 3/0985; G06N 3/0464; G06N 3/0499; G06N 3/096; G06N 3/0455; G06N 3/084
USPC ........................................................ 382/155
See application file for complete search history.

(56) References Cited

U.S. PATENT DOCUMENTS

2015/0324686 A1 11/2015 Julian et al.
2018/0089591 A1 3/2018 Zeiler et al.
2023/0052255 A1 2/2023 He et al.

FOREIGN PATENT DOCUMENTS

EP 4507319 A1 * 2/2025 ............... G06T 5/60
WO 2023086198 A1 5/2023
WO 2023129190 A1 7/2023
(Continued)

OTHER PUBLICATIONS

Chauhan V.K., et al., "A Brief Review of Hypernetworks in Deep Learning", Arxiv.Org, Cornell University Library, 201 Olin Library Cornell University Ithaca, NY 14853, arXiv:2306.06955v2 [cs.LG], Aug. 10, 2023, pp. 1-19, XP091581695, the whole document.
(Continued)

*Primary Examiner* — Charlotte M Baker
(74) *Attorney, Agent, or Firm* — QUALCOMM Incorporated; Espartaco Diaz Hidalgo

(57) ABSTRACT

A device includes a memory configured to store a first model and a second model. The first model is configured to perform inference based on a first set of parameters corresponding to a first context. The device includes one or more processors configured to process, using the second model, the first set of parameters and input corresponding to a second context to generate an output of the second model. The one or more processors are also configured to update the first model to perform inference using an updated set of parameters based on the output of the second model.

24 Claims, 15 Drawing Sheets

(56) References Cited

FOREIGN PATENT DOCUMENTS

WO WO-2024086333 A1 * 4/2024 ............. G06N 3/047

OTHER PUBLICATIONS

Chen Y., et al., "Transformers as Meta-Learners for Implicit Neural Representations", Springer International Publishing, Oct. 23, 2022, XP047637838, pp. 170-187, abstract, figures 1-3, 6, table 2, sections 1-3.3, 4, and 6.

International Search Report and Written Opinion—PCT/US2024/060571—ISA/EPO—Mar. 21, 2025.

Li X., et al., "SymmNeRF: Learning to Explore Symmetry Prior for Single-View View Synthesis", arXiv:2209.14819v1 [cs.CV], Sep. 29, 2022, XP093125765, pp. 1-29, The Whole Document.

Mittal A., "Neural Radiance Fields: Past, Present, and Future", Arxiv.Org, Cornell University Library, 201 Olin Library Cornell University Ithaca, NY 14853, arXiv:2304.10050v1 [cs.CV], Apr. 20, 2023, pp. 1-122, XP091493004, the whole document.

Sen B., et al., "HyP-NeRF: Learning Improved NeRF Priors Using a HyperNetwork", Arxiv.Org, Cornell University Library, 201 Olin Library Cornell University Ithaca, NY 14853, arXiv:2306.06093v1 [cs.CV], Jun. 9, 2023, XP091534595, pp. 1-20, The Whole Document.

* cited by examiner

Iteration Number 206
g 124
410
128
$\theta_1$
Parameter Encoder
126
$I_1$
Image Encoder
420A
130
$I_2$
Image Encoder
420B
430
Joint Encoder
440
Parameter Decoder
132
$\Delta\theta$

USE OF A MACHINE LEARNING MODEL TO UPDATE ANOTHER MACHINE LEARNING MODEL

I. FIELD

The present disclosure is generally related to updating a machine learning model.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices can incorporate functionality based on machine learning (ML) models. ML models such as deep neural networks (DNNs) include parameters (e.g., weights and/or biases) that enable such models to be trained based on a particular context to perform inferences corresponding to that context. For example, Neural Radiance Field (NeRF) models can be trained to encapsulate an environment (e.g., a 2D image, a 3D object, or a 3D scene) via implicitly learning the geometry of the environment given a set of observations, enabling generation of novel and consistent views of the environment. For example, a NeRF model f can be trained based on a two-dimensional (2D) initial image $I_1$ to generate pixel predictions for $I_1$ using a set of parameters $\theta_1$. In an inference operation, a pixel location (e.g., (x,y) coordinates) is input to f, and f generates a predicted output pixel value for that pixel location. Sequentially iterating over all pixel locations results in an output that reproduces the initial image $I_1$.

However, a NeRF model can only be trained for a single environment at a time, and another round of training is needed to update the parameters $\theta_1$ to use the NeRF model for another environment. Such training is computationally expensive and time-consuming.

III. SUMMARY

According to a particular implementation of the techniques disclosed herein, a device includes a memory configured to store a first model and a second model. The first model is configured to perform inference based on a first set of parameters corresponding to a first context. The device includes one or more processors configured to process, using the second model, the first set of parameters and input corresponding to a second context to generate an output of the second model. The one or more processors are also configured to update the first model to perform inference using an updated set of parameters based on the output of the second model.

According to a particular implementation of the techniques disclosed herein, a method includes obtaining a first model and a second model. The first model is configured to perform inference based on a first set of parameters corresponding to a first context. The method includes processing, using the second model, the first set of parameters and input corresponding to a second context to generate an output of the second model. The method also includes updating the first model to perform inference using an updated set of parameters based on the output of the second model.

According to a particular implementation of the techniques disclosed herein, a non-transitory computer-readable medium includes instructions that, when executed by one or more processors, cause the one or more processors to obtain a first model and a second model. The first model is configured to perform inference based on a first set of parameters corresponding to a first context. The instructions, when executed by the one or more processors, cause the one or more processors to process, using the second model, the first set of parameters and input corresponding to a second context to generate an output of the second model. The instructions, when executed by the one or more processors, also cause the one or more processors to update the first model to perform inference using an updated set of parameters based on the output of the second model.

According to a particular implementation of the techniques disclosed herein, an apparatus includes means for obtaining a first model and a second model. The first model is configured to perform inference based on a first set of parameters corresponding to a first context. The apparatus includes means for processing, using the second model, the first set of parameters and input corresponding to a second context to generate an output of the second model. The apparatus also includes means for updating the first model to perform inference using an updated set of parameters based on the output of the second model.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods to use a ML model to update another ML model are disclosed. For example, although deep neural network models such as NeRF models can be trained to encapsulate an environment via implicitly learning the geometry of the environment given a set of observations, enabling generation of novel and consistent views of the environment, re-training such models for another environment is computationally expensive and time-consuming.

The disclosed systems and methods enable re-training of a first model (e.g., a first DNN), such as a NeRF trained to encapsulate a first environment, using a second model (e.g., a second DNN). The second model is configured to adjust parameters of the first model, or generate adjustment values for the parameters of the first model, which are used to update the first model to encapsulate a second environment. According to an aspect, the parameters of the first model and information corresponding to the second environment are input to the second model, and one or more inference operations of the second model are performed to generate adjusted parameter values with which to update the first model. According to an aspect, as compared to performing conventional iterative training to train the first model from scratch, which may require several minutes or longer to perform 1,000 training iterations to reach a particular accuracy, a relatively small number of inference operations (e.g., 50 inferences) of the second model can be performed in a few seconds to generate adjusted parameters for updating the first model, with the updated first model providing substantially the same accuracy as provided by the 1,000 conventional training iterations.

Thus, the problem that conventional training of a ML model is computationally expensive and time-consuming is solved by using a second ML model that predicts updated parameters of the ML model much faster, and using lower-complexity operations, as compared to conventional training. As a result, ML models can be re-trained for novel environments by mobile devices or other resource-constrained systems, and may be used in scenarios in which delays of several minutes or more are unsatisfactory (e.g., in a virtual reality use case) and/or prohibitive (e.g., in a driver assistance use case).

Figure 1:
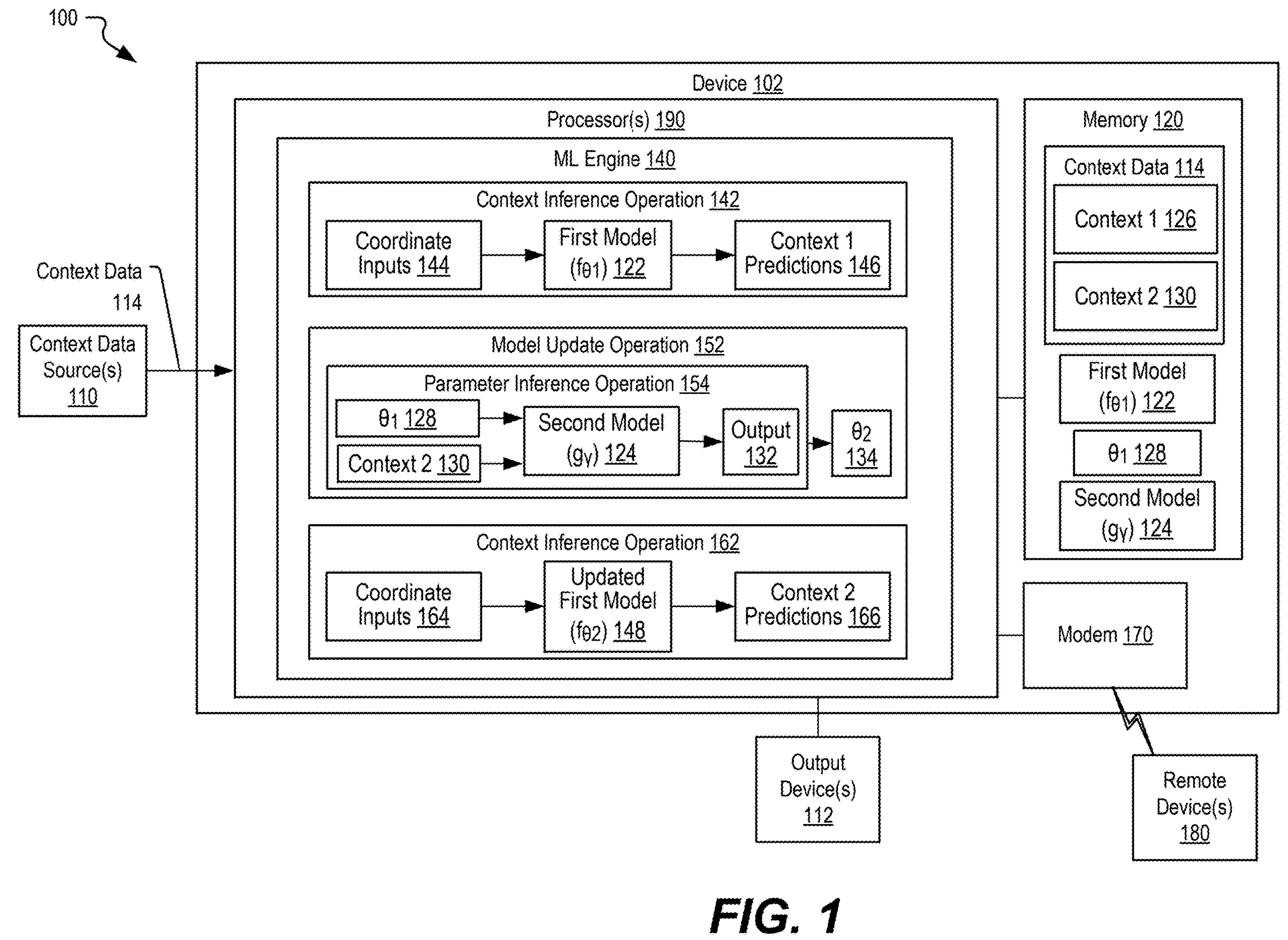
FIG. 1 is a block diagram illustrating an example of a system operable to use a ML model to update another ML model, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some embodiments the device 102 includes a single processor 190 and in other embodiments the device 102 includes multiple processors 190. For ease of reference herein, such features are generally introduced as "one or more" features and are subsequently referred to in the singular or optional plural (as indicated by "(s)" in the name of the feature) unless aspects related to multiple of the features are being described.

Figure 8:
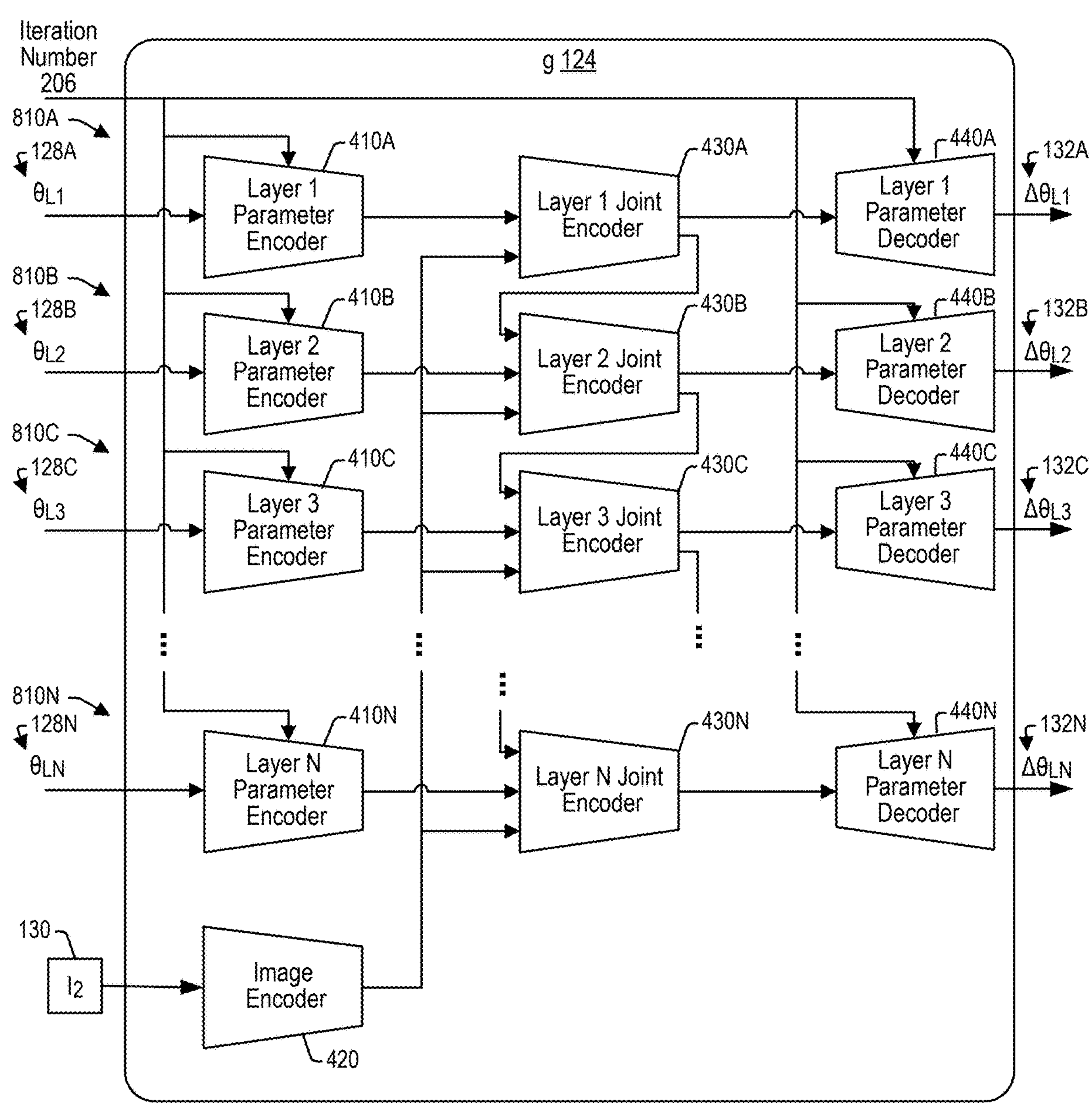
FIG. 8 is a block diagram illustrating an example of components that can be implemented in a system operable to use a ML model to update another ML model, in accordance with some examples of the present disclosure.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, FIG. 8 depicts parameter encoders 410 associated with reference numbers 410A-410N. When referring to a particular one of these parameter encoders, such as a parameter encoder 410A, the distinguishing letter "A" is used. However, when referring to any arbitrary one of these parameter encoders or to these parameter encoders as a group, the reference number 410 is used without a distinguishing letter.

As used herein, the terms "comprise," "comprises," and "comprising" may be used interchangeably with "include," "includes," or "including." Additionally, it will be understood that the term "wherein" may be used interchangeably with "where." As used herein, "exemplary" may indicate an example, an embodiment, and/or an aspect, and should not be construed as limiting or as indicating a preference or a preferred embodiment. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "obtaining," "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, retrieving, receiving, or accessing the parameter (or signal) that is already generated, such as by another component or device.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows-a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so called "transfer learning." In transfer learning a base model may be trained using a generic or typical data set, and the base model may be subsequently refined (e.g., re-trained or further trained) using a more specific data set.

A data set used during training is referred to as a "training data set" or simply "training data". The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

FIG. 1 shows a block diagram of a system 100 that includes a device 102 that is configured to use a ML model to update another ML model. The device 102 includes a memory 120 that is coupled to one or more processors 190 and configured to store a first model ($f_{\theta 1}$) 122, a second model ($g_{\gamma}$) 124, a first set of parameters ($\theta_1$) 128, and context data 114, such as data associated with a first context 126 and a second context 130. In a particular embodiment, the memory 120 corresponds to a dynamic random access memory (DRAM) of a double data rate (DDR) memory subsystem, static random access memory (SRAM), one or more other types of devices configured to store data and/or instructions that are executable by the processor 190, or a combination thereof.

The processor 190 is configured to perform operations associated with a ML engine 140. In various embodiments, some or all of the functionality associated with the ML engine 140 is performed via execution of instructions by the processor 190, performed by processing circuitry of the processor 190 in a hardware implementation, or a combination thereof.

The ML engine 140 is configured to perform a context inference operation 142 using the first model 122. The first model 122 is configured to perform inference based on the first set of parameters 128 corresponding to the first context 126 (e.g., a 2D or 3D representation of a first scene or a first 3D object). In the present example, the first model 122 corresponds to a NeRF model. In the following examples, the first context 126 and the second context 130 refer to 2D images and/or image information, and coordinates (x,y) are used to index pixels in the images, for purpose of explanation. However, in other embodiments the first context 126 and the second context 130 can generally be any information or meta-information (e.g., multi-view images, depth information, 3D scans, descriptors provided from large language models (LLMs), camera pose information, etc.) regarding a scene or environment.

The context inference operation 142 includes executing inference operations using the first model 122 to generate output associated with the first context 126, such as representations of a first scene from one or more viewpoints. For example, each inference operation using the first model 122 processes coordinate inputs 144, such as (x,y) coordinates, to generate first context predictions 146, such as predicted pixel values associated with the coordinate inputs 144.

The ML engine 140 is also configured to perform a model update operation 152 to update the first model 122 to generate output associated with the second context 130. For example, the processor 190 can receive input corresponding to the second context 130, such as a 2D or 3D representation of a second scene or a second 3D object. To illustrate, the input corresponding to the second context 130 can include multiple images of a scene taken by one or more cameras and camera pose information associated with each of the multiple images.

During the model update operation 152, the ML engine 140 updates the first set of parameters 128 of the first model 122 to generate an updated set of parameters ($\theta_2$) 134 of an updated first model ($f_{\theta 2}$) 148 that can be used for the second context 130. For example, the ML engine 140 is configured to perform one or more iterations of a parameter inference operation 154 that includes processing, using the second model 124, the first set of parameters 128 and input corresponding to the second context 130 to generate an output 132 of the second model 124. To illustrate, generation of the output 132 of the second model 124 may include performance of multiple iterations of inference at the second model 124, in which updated parameters associated with the output 132 of each inference iteration provide improved accuracy of the updated first model 148. The model update operation 152 also includes updating the first model 122 to perform inference using the updated set of parameters 134 that are based on the output of the second model 124. According to an aspect, each of the first set of parameters 128, the updated set of parameters 134, and the output 132 of the second model 124 is a vector of weights, biases, or any other parameter that can be input to the first model 122 (or adjustment values to such parameters).

Figure 4:
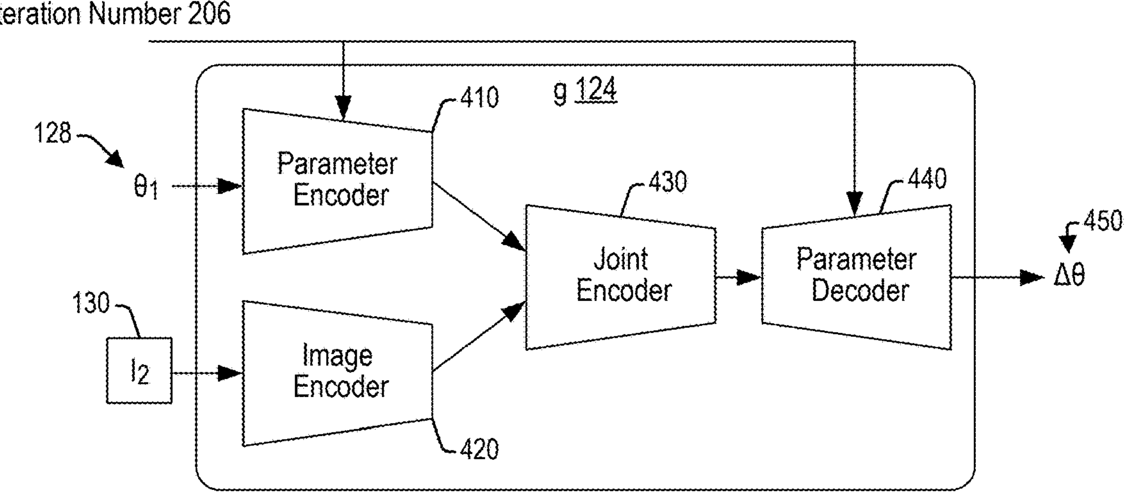
FIG. 4 is a block diagram illustrating an example of components that can be implemented in the system of FIG. 1, in accordance with some examples of the present disclosure.

In a particular embodiment, such as described further with reference to FIG. 4, the second model 124 includes a parameter encoder configured to process an input set of parameters, a context encoder configured to process the input corresponding to the second context 130, a joint encoder configured to process outputs of the parameter encoder and the context encoder, and a parameter decoder configured to process an output of the joint encoder to generate the output 132. Additional illustrative examples of components that can be implemented in the second model 124 are described with reference to FIGS. 8, 9A, and 9B.

The model update operation 152 also includes updating the first model 122 to perform inference using the updated set of parameters 134 that are based on the output 132 of the second model 124. To illustrate, the output 132 of the second model 124 can include the updated set of parameters 134 or can include a set of adjustment values to apply to the first set of parameters 128 to generate the updated set of parameters 134. Examples of operations associated with the model update operation 152 are described in further detail with reference to FIGS. 2A and 2B.

In some embodiments, after the first model 122 is updated based on the output 132 of the second model 124 to generate the updated first model 148, the ML engine 140 is further configured to perform one or more training operations on the updated first model 148 to enhance an inference accuracy of the updated first model 148 for the second context 130, as part of the model update operation 152. In an example, the training operations may be performed until the inference accuracy reaches an accuracy threshold. In some embodiments, the one or more processors are configured to alternate between parameter updates using training operations and parameter updates using the second model 124 until the inference accuracy reaches an accuracy threshold.

The updated first model 148 is configured to perform inference based on the updated set of parameters 134 corresponding to the second context 130. For example, the ML engine 140 is configured to perform a context inference operation 162 using the updated first model 148. The context inference operation 162 includes processing coordinate inputs 164 at the updated first model 148 to generate second context predictions 166 corresponding to the second context 130.

The device 102 (e.g., the processor 190) is configured to output data based on the first context predictions 146, the second context predictions 166, or both. For example, the device 102 is optionally coupled to one or more output devices 112 that are configured to provide output associated with operation of the ML engine 140 to a user of the device 102. To illustrate, the output device 112 can include a display device configured to display image data generated using the first model 122, image data generated using the updated first model 148, or both.

The device 102 is optionally coupled to one or more context data sources 110 that are configured to provide at least a portion of the context data 114 to the processor 190. For example, the context data sources 110 can include one or more cameras that are configured to generate the context data 114 associated with the second context 130 and that are integrated within or coupled to the device 102. As another example, the context data sources 110 can include one or more remote devices 180. In the example illustrated in FIG. 1, the device 102 optionally includes a modem 170 that is coupled to the processor 190 and configured to receive the first model 122, the second model 124, the first set of parameters 128, data corresponding to the first context 126, data corresponding to the second context 130, or a combination thereof, from the remote device 180.

In some embodiments, in order to improve the speed and/or accuracy of generating the updated set of parameters 134, the processor 190 can perform a starting parameter set selection operation to find an existing set of parameters that corresponds to a context that is similar to the second context 130. In some embodiments, such as described further with reference to FIG. 6 and FIG. 7, the processor 190 is configured to access a collection of stored parameter sets corresponding to multiple contexts for the first model 122 and identify, based on a similarity measure, a particular context of the multiple contexts that has a closest similarity to the second context 130. The processor 190 can select, as the first set of parameters 128, the stored parameter set that corresponds to the identified particular context for use as a starting point to generate the updated first model 148. The collection of stored parameter sets can be stored at the memory 120, at the remote device 180, or a combination of both.

As compared to performing conventional iterative training to train the first model 122 from scratch, which may require several minutes to several hours, a relatively small number of inference operations of the second model 124 can be performed in a few seconds to generate the updated parameters 134 for the updated first model 148, which may provide substantially the same accuracy as the conventional iterative training. Thus, the model update operation 152 enables the device 102 to quickly generate updated models for new environments in a resource-constrained system, such as a mobile device or head-mounted display.

Although the second model 124 is illustrated as processing the first set of parameters 128 and input corresponding to the second context 130 to generate the output 132, in some embodiments the second model 124 is configured to generate the output 132 further based on input corresponding to the first context 126 or based on a difference measurement of the first context 126 to the second context 130, such as described in further detail with reference to FIGS. 9A and 9B.

Although one or more portion of the context data 114 (e.g., data associated with the second context 130) is described as being provided by the context data source 110, such as from one or more cameras or from the memory 120, in other embodiments one or more portions the context data 114 can instead be generated by the processor 190 (e.g., a digital signal processor (DSP), such as audio including speech corresponding to an output of a game engine or other speech generation application), an output of another component of the device 102, or received from another device (e.g., the remote device 180).

In some implementations, the device 102 corresponds to or is included in one of various types of devices. In an illustrative example, the ML engine 140 (e.g., the processor 190) is integrated in at least one of a mobile phone or a tablet computer device, as described with reference to FIG. 12, a wearable electronic device, as described with reference to FIG. 13, a mixed reality or augmented reality glasses device, as described with reference to FIG. 14, a virtual reality, mixed reality, or augmented reality headset, as described with reference to FIG. 15, a camera device, as described with reference to FIG. 16, or a voice-controlled speaker system, as described with reference to FIG. 17. In another illustrative example, the processor 190 is integrated into a vehicle that includes a camera configured to generate context data associated with the second context 130, such as described further with reference to FIG. 18 and FIG. 19.

Figures 2A, 2B:
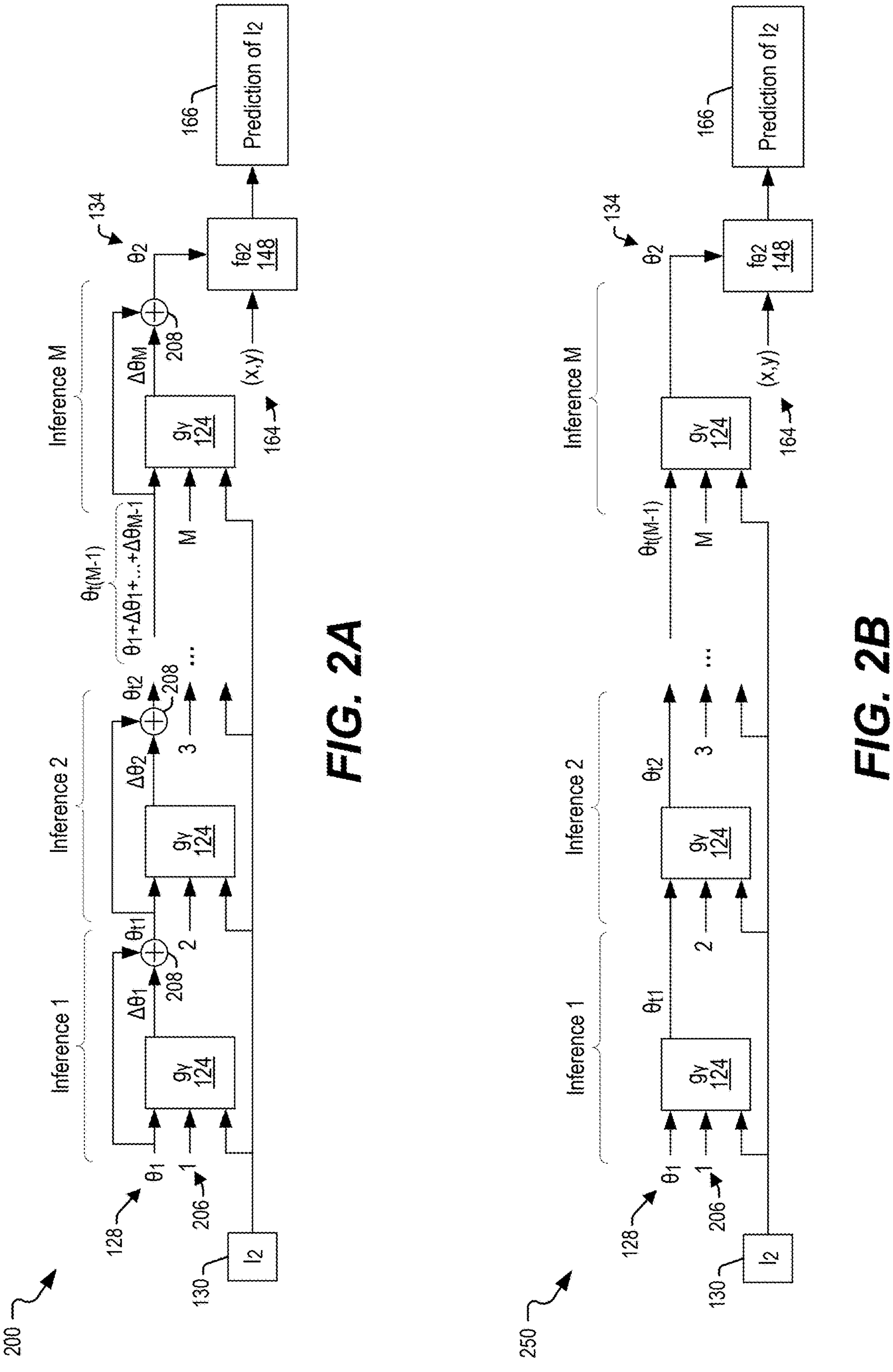
FIGS. 2A and 2B are diagrams illustrating examples of components and operations that can be implemented in the system of FIG. 1, in accordance with some examples of the present disclosure.

FIGS. 2A and 2B depict examples of components and operations that can be implemented in the system of FIG. 1. In each of FIGS. 2A and 2B, a sequence of operations is depicted that can be performed by the ML engine 140 during the model update operation 152. The operations include performing multiple iterations of inference at the second model 124 (e.g., multiple iterations of the parameter inference operation 154) to generate the updated set of parameters $\theta_2$ 134. The second model 124 is labeled "$g_\gamma$" indicating that the second model 124 uses a set of parameters "$\gamma$" that enable the second model 124 to generate inference outputs to modify parameters for the first model 122 based on the context data input to the second model 124. An example of training the second model 124 to obtain the set of parameters $\gamma$ is described in further detail with reference to FIG. 3.

In FIG. 2A, the operations 200 include, in the first iteration (inference 1) of the sequence, inputting the first set of parameters $\theta_1$ 128 and information (e.g., pixels) corresponding to the second context 130 (e.g., an image $I_2$) into to the second model 124. The second model 124 generates a first adjustment value $\Delta\theta_1$ for the first set of parameters $\theta_1$ 128 in the first iteration, and the first adjustment value $\Delta\theta_1$ is added to the first set of parameters $\theta_1$ 128 at a combiner (e.g., adder) 208 to generate a first intermediate set of parameters $\theta_{t1}$ (e.g., $\theta_1+\Delta\theta_1$).

In the second iteration (inference 2), the first intermediate set of parameters $\theta_{t1}$ is input to the second model 124 along with the information corresponding to the second context $I_2$ 130 to generate a second adjustment value $\Delta\theta_2$. The second adjustment value $\Delta\theta_2$ is added to the first intermediate set of parameters $\theta_{t1}$ at the combiner 208 to generate a second intermediate set of parameters $\theta_{t2}$ (e.g., $\theta_1+\Delta\theta_1+\Delta\theta_2$).

Optionally, an iteration number 206 (e.g., 1, 2, etc.) is also input to the second model 124 in each iteration. The second model 124 may be trained to adjust generation of adjustment values $\Delta\theta$ based on the iteration number 206, such as by performing coarser "tuning" for the set of parameters in earlier iterations and finer tuning in later iterations. For example, the second model 124 may be trained such that, as the iteration number 206 increases, the scale of the adjustment value $\Delta\theta$ should get smaller. To illustrate, during training of the second model 124, one or more loss functions may be weighted differently based on the iteration number 206.

One or more additional iterations of inference at the second model 124 are performed in a substantially similar manner as described with reference to the second iteration. The iterative process ends after an $M^{th}$ iteration (M is a positive integer) that outputs an $M^{th}$ adjustment value $\Delta\theta_M$, which is combined with the $(M-1)^{th}$ intermediate set of parameters $\theta_{t(M-1)}$ to generate updated set of parameters $\theta_2$ 134.

In the embodiment of FIG. 2A, the output 132 of FIG. 1 includes the set of adjustment values $\Delta\theta_1 \ldots \Delta\theta_M$, which are applied to the first set of parameters $\theta_1$ 128 to generate the updated set of parameters $\theta_2$ 134 as the sum $\theta_2=\theta_1+\Delta\theta_1+\ldots+\Delta\theta_M$. Generation of the output 132 thus includes performance of multiple iterations of inference at the second model 124.

The operations 200 also depict that operating the first model 122 using the updated set of parameters $\theta_2$ 134—that is, using the updated first model 148—results in generation of the second context predictions 166, such as predicted pixel values of the second context $I_2$ 130. To illustrate, the coordinate inputs 164 can be configured to scan over pixel coordinates and processed by the updated first model 148 to generate predicted pixel values, resulting in a potentially novel view of second context $I_2$ 130.

In some embodiments, the number of iterations M is a hyperparameter. Alternatively, M may be determined based on measuring a quality of the second context predictions 166 generated by the updated first model 148 after one or more inference iterations. For example, the operations 200 may include periodically testing the updated first model 148 using the current intermediate set of parameters $\theta_t$ to determine a quality metric (e.g., PSNR) of the resulting second context predictions 166. The operations 200 may terminate when the quality metric is above a quality threshold, or when a difference metric between the second context predictions 166 and the second context 130 is smaller than a difference threshold.

In FIG. 2B, the operations 250 are performed in a similar manner as the operations 200 of FIG. 2A. However, as compared to FIG. 2A, the combiner 208 is omitted, and the second model 124 is configured to directly generate the intermediate sets of parameters $\theta_{t1}, \theta_{t2}, \ldots \theta_{t(M-1)}$ and the updated set of parameters 134, rather than generating the adjustment values $\Delta\theta_1, \Delta\theta_2, \ldots \Delta\theta_M$ of FIG. 2A. Therefore, in the embodiment of FIG. 2B, the output 132 of the second model 124 includes the updated set of parameters 134.

Outputting the intermediate sets of parameters $\theta_{t1}, \theta_{t2}, \ldots \theta_{t(M-1)}$ of FIG. 2B instead of the adjustment values $\Delta\theta_1, \Delta\theta_2, \ldots \Delta\theta_M$ of FIG. 2A enables the combiners 208 to be omitted and may reduce complexity. However, outputting the adjustment values $\Delta\theta_1, \Delta\theta_2, \ldots \Delta\theta_M$ of FIG. 2A may enable the second model 124 to provide a larger dynamic range of parameter adjustments, and potentially greater accuracy, as compared to directly outputting the intermediate sets of parameters $\theta_{t1}, \theta_{t2}, \ldots \theta_{t(M-1)}$ of FIG. 2B.

According to an aspect, the quality (e.g., peak SNR) of the second context predictions 166 of the second context $I_2$ 130 after running 50 iterations (M=50) of lower-complexity inferences, as depicted in either FIG. 2A or FIG. 2B, can approximate or substantially match the quality that would result from performing 1,000 conventional training cycles of the first model 122 using higher-complexity backpropagation, thus providing significant savings of processing resources and time as compared to conventional techniques.

Figure 3:
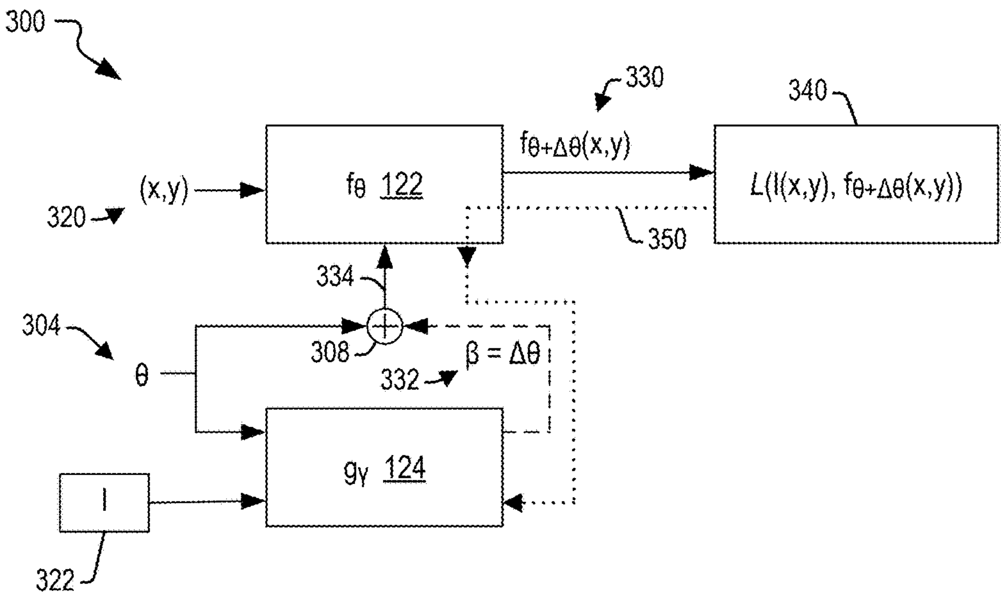
FIG. 3 is a block diagram illustrating an example of components and operations that can be implemented in the system of FIG. 1, in accordance with some examples of the present disclosure.

FIG. 3 depicts an example 300 of components and operations that can be implemented during training of the second model 124, such as in the device 102 of FIG. 1 or in a remote system, such as the remote device 180. As illustrated, training of the second model 124 to learn how to adjust the parameters of the first model 122 can be performed using gradient based optimization operations that include a forward pass and a backward pass. During the forward pass, the second model 124 receives the current parameters $\theta$ 304 of the first model 122 and context information I 322, such as the set of pixel values corresponding to all (x,y) pixel coordinates associated with a collection of two-dimensional images. The second model 124 outputs a set of adjustment values $\Delta\theta$, denoted as $\beta$ 332, which are added to the parameters 0 304 of the first model 122 at a combiner 308 (e.g., an adder) to generate an updated set of parameters 334 for the first model 122.

Also during the forward pass, the first model 122 receives coordinate inputs 320 and processes the coordinate inputs 320 using the updated set of parameters 334 to generate an inference output 330 (e.g., pixel predictions), denoted $f_{\theta+\Delta\theta}(x,y)$. The inference output 330 is used to determine a loss function $\mathcal{L}$ 340 that is a function of the context information 322 and the inference output 330, denoted as $\mathcal{L}(I(x, y), f_{\theta+\Delta\theta}(x, y))$.

During the backward pass, backpropagation is performed to adjust the parameters $\gamma$ of the second model 124, graphically illustrated as a data path 350. Since a complete differentiable computational graph forms under the depicted formulation, the gradients of the loss function $\mathcal{L}$ 340 with respect to the parameters $\gamma$ of the second model 124 can be computed using the chain rule, $$\frac{\partial \mathcal{L}}{\partial \gamma} = \frac{\partial \mathcal{L}}{\partial \beta} \cdot \frac{\partial \beta}{\partial \gamma}$$

and optimized accordingly.

The sequence of forward passes and backward passes may be iteratively repeated to adjust the parameters γ of the second model 124 so that the adjustment values β 332 output by the second model 124, and thus the updated set of parameters 334, result in inference outputs 330 of the first model 122 that reduce or minimize the loss function $\mathcal{L}$ 340. Selection of the context information 322 can train the second model 124 for domain specificity, such as for face images as an illustrative, non-limiting example, resulting in improved performance of the second model 124 for the trained domain.

FIG. 4 depicts an example of components that can be implemented in the system of FIG. 1. In the embodiment illustrated in FIG. 4, the second model 124 includes a parameter encoder 410, a context encoder (e.g., an image encoder) 420, a joint encoder 430, and a parameter decoder 440. The parameter encoder 410 is configured to receive and process an input set of parameters, illustrated as the first set of parameters 128 associated with the first context 126, and the iteration number 206. The context encoder 420 is configured to process input corresponding to a second context. For example, the context encoder 420 may receive input corresponding to the second context 130, such as 2D images, and the context encoder 420 may function as an image encoder.

The joint encoder 430 is configured to process outputs of the parameter encoder 410 and the context encoder 420. For example, the joint encoder 430 may modulate weights of the first set of parameters 128 based on the information of the second context 130, such as a multi-layer perceptron (MLP) that receives a concatenation of image features from the context encoder 420 and parameter features from the parameter encoder 410 and performs processing similar to matrix multiplication.

The parameter decoder 440 is configured to process an output of the joint encoder 430 and the iteration number 206 to generate the output 132 of the second model 124, illustrated as a set of adjustment values 450.

In a particular embodiment, each of the parameter encoder 410, the context encoder 420, the joint encoder 430, and the parameter decoder 440 is implemented as an MLP. However, in other embodiments, one or more of the parameter encoder 410, the context encoder 420, the joint encoder 430, or the parameter decoder 440 can be different. In an illustrative example, the context encoder 420 can include or be implemented as a transformer or a convolutional neural network (CNN), and the parameter encoder 410, the joint encoder 430, and the parameter decoder 440 can include or be implemented as transformer-based models that benefit from using self-attention or cross-attention mechanisms. Skip connections similar to those in the ResNet networks may also be used in one of more of the parameter encoder 410, the context encoder 420, the joint encoder 430, and the parameter decoder 440.

The parameter encoder 410, the context encoder 420, the joint encoder 430, and the parameter decoder 440 can be jointly trained during training of the second model 124, such as described with reference to FIG. 3. However, in some embodiments, the context encoder 420 can be partially or fully "frozen" so that the behavior of the context encoder 420 does not change during the training of the second model 124.

The examples provided above enable generation of the updated parameters 134 using the second model 124 and eliminating the conventional training requirement associated with updating the first model 122 to correspond to the second context 130. However, in some embodiments, after the first model 122 is updated based on the output of the second model 124, the ML engine 140 also performs one or more conventional training operations on the updated first model 148 to enhance an inference accuracy of the updated first model 148 for the second context 130. Such conventional training operations may be performed until the inference accuracy reaches an accuracy threshold. For example, after generating the updated parameters 134 based on the sequence of inference operations as depicted in FIG. 2A or 2B, the ML engine 140 may perform conventional training (e.g., using backpropagation) during the model update operation 152 to further improve the accuracy of the updated first model 148 in predicting the second context 130, as described with reference to FIG. 5.

Figure 5:
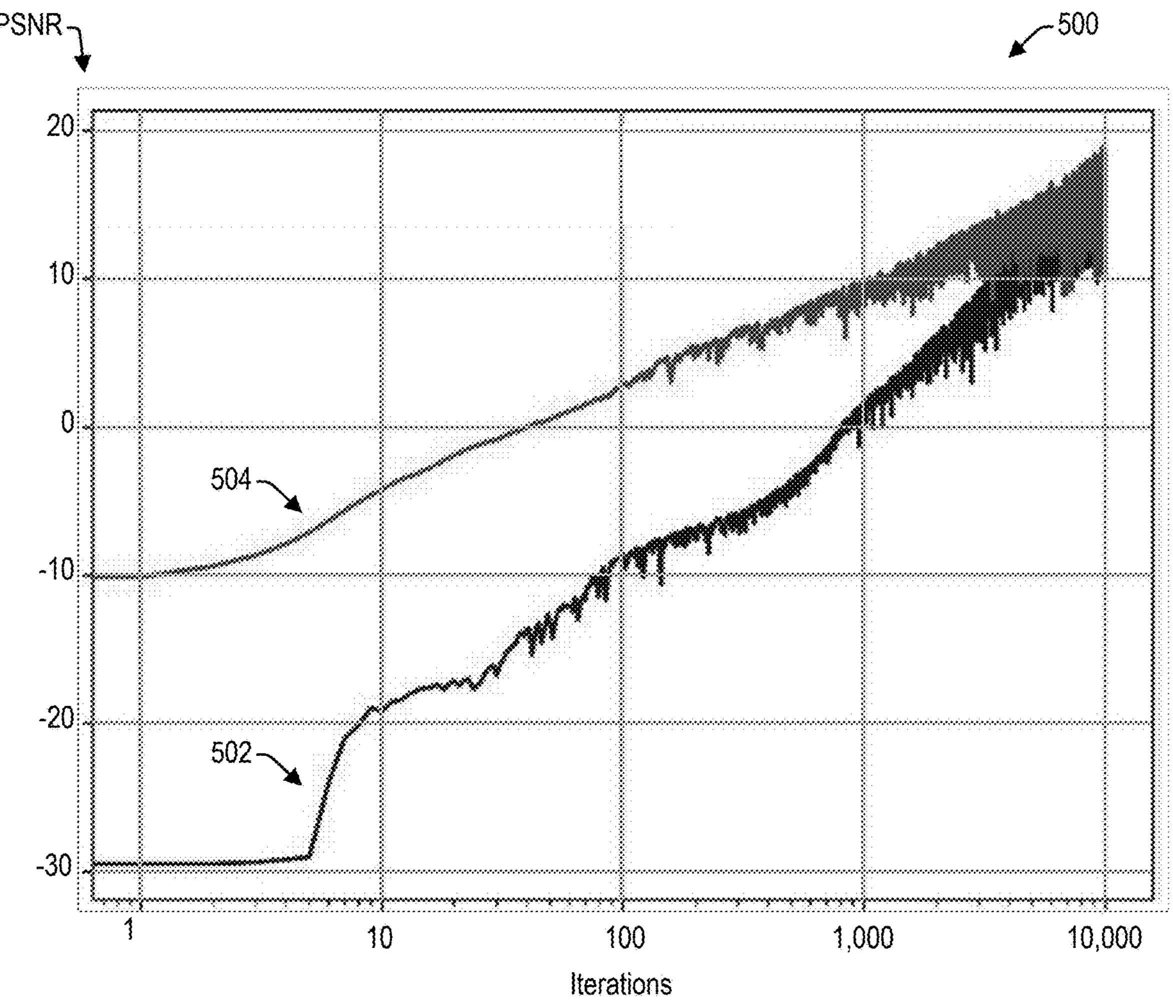
FIG. 5 is a chart illustrating an example of performance of the system of FIG. 1, in accordance with some examples of the present disclosure.

In FIG. 5, a chart 500 depicts a quality metric, illustrated as PSNR, on the vertical axis, and a number of iterations of backpropagation training on the horizontal axis, and shows an illustrative, non-limiting example of improved performance that may be attained in some implementations. A first curve 502 illustrates PSNR associated with the number of iterations of conventional training that have been performed to adapt the first model 122 to correspond to the second context 130 in a conventional system. A second curve 504 illustrates PSNR associated with the number of iterations of conventional training that have been performed to adapt the first model 122 after first performing 5 iterations of the parameter inference operation 154 using the second model 124, in accordance with the present disclosure.

As illustrated in the chart 500, training the first model 122 for 5 iterations of the parameter inference operation 154 followed by 50 iterations of conventional training results in the same PSNR (0 dB) as 1,000 iterations of conventional training. In particular, the second curve 504 reaches PSNR=0 dB after approximately 50 iterations, while the first curve 502 requires approximately 1,000 iterations to reach PSNR=0 dB. Further, at 1,000 iterations, the second curve 504 has a PSNR of approximately 10 dB as compared to the first curve 502 having a PSNR that is approximately 10 dB lower, at approximately 0 dB. Thus, training the first model 122 for 5 iterations of the parameter inference operation 154 followed by 1,000 iterations of conventional training results in a much higher quality (+10 dB) compared to conventional training using the same number of iterations.

Thus, a small number of training iterations can result in high quality outputs. As a result, such training can be performed using fewer resources (e.g., processing, power, time) as compared to full-fledged conventional training, enabling model training to be performed in resource-constrained environments such as mobile devices.

In some implementations, the ML engine 140 may perform multiple iterations of alternating between parameter adjustment using the second model 124 and parameter adjustment using conventional training, which may result in faster convergence to a set of updated parameters 134 for the updated first model 148 that satisfy an accuracy criteria, as compared to using the second model 124 alone. To illustrate, the ML engine 140 can be configured to alternate between (e.g., interleave) parameter updates using training operations and parameter updates using the second model 124 until the inference accuracy reaches an accuracy threshold.

For example, upon encountering a new context 130 (e.g., a new image, scene, or environment), the ML engine 140 may perform a first cycle (e.g., one or more iterations) of the parameter inference operation 154 to update the parameters of the first model 122. Using the updated parameters obtained in the parameter inference operation 154, the ML engine 140 may also perform a few iterations of explicit (conventional) training of the updated first model 148, followed by performing a second cycle of the parameter inference operation 154 to generate further updated parameters. For the second cycle of the cycle of the parameter inference operation 154, the second model 124 receives the latest set of parameters for the updated first model 148 as input and further adjusts the parameters. Such alternating between using the parameter inference operation 154 and conventional training iterations can continue while the convergence (e.g., increased PSNR per iteration) occurs more quickly as compared using conventional training (e.g., the increase of PSNR per iteration for the first curve 502 of FIG. 5). Repeatedly alternating between using the parameter inference operation 154 and conventional training iterations may improve upon the performance illustrated in the second curve 504 of FIG. 5, e.g., resulting in the PSNR increasing at a faster rate per iteration than exhibited by the second curve 504.

Figure 6:
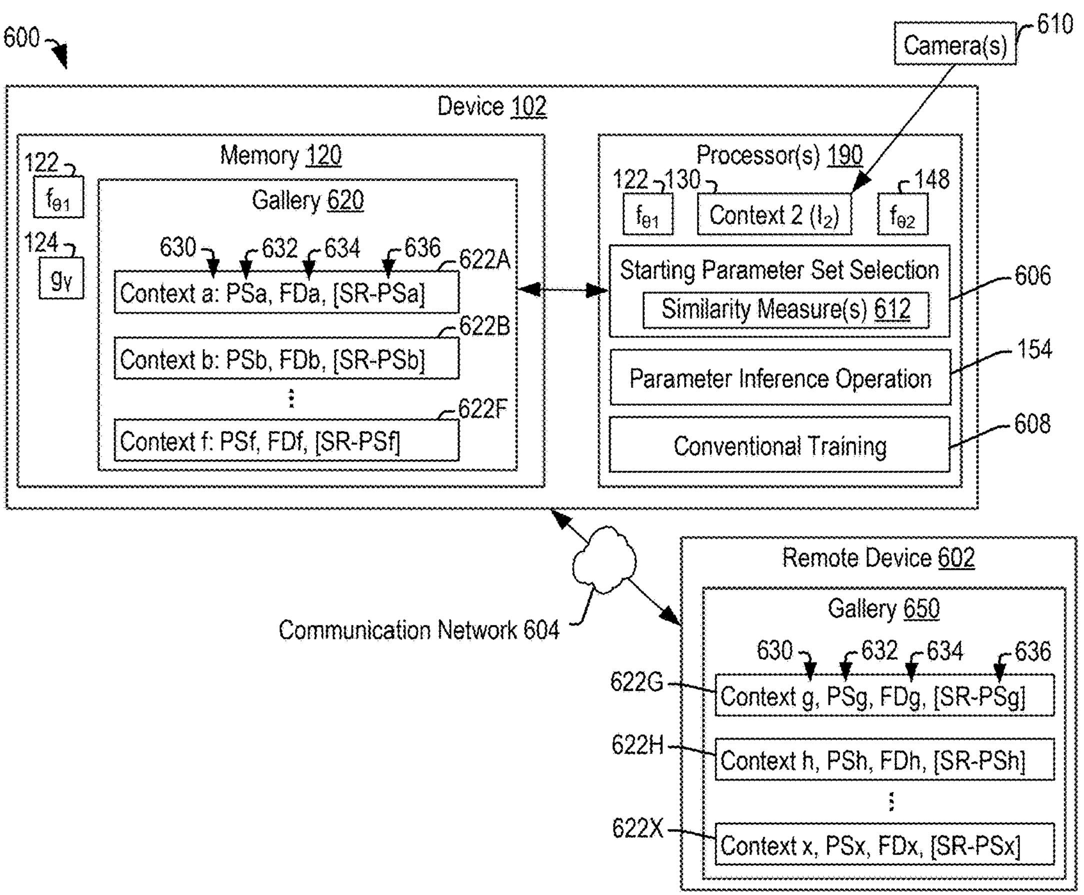
FIG. 6 is a block diagram illustrating an example of a system operable to use a ML model to update another ML model, in accordance with some examples of the present disclosure.

FIG. 6 depicts an example of a system 600 that includes the device 102 coupled to a remote device 602 via a communication network 604. The device 102 includes the processor 190 and the memory 120, and is coupled to (or includes) one or more cameras 610. The camera 610 may be coupled to or included in the device 102 and may correspond to the context data source 110 of FIG. 1. The memory 120 includes the first model 122, the second model 124, and a gallery 620 of stored parameter sets corresponding to multiple contexts (e.g., different images, scenes, environments, etc.), as described further below. The remote device 602 also stores a gallery 650 of stored parameter sets corresponding to multiple contexts. In a particular embodiment, the remote device 602 corresponds to the remote device 180 of FIG. 1 and may be a remote server, such as a cloud server, with larger processing and storage capacity than the device 102.

In order to improve the speed and/or accuracy of generating the updated set of parameters $\theta_2$ 134 for a new environment (e.g., one or more images received from the camera 610 as the second context $I_2$ 130), the processor 190 can perform a starting parameter set selection operation 606 to find an existing set of parameters that corresponds to a context that is similar to the second context $I_2$ 130. For example, the processor 190 may access a collection of stored parameter sets (e.g., the gallery 620, the gallery 650, or both) corresponding to multiple contexts for the first model 122 and identify, based on a similarity measure 612, a particular context of the multiple contexts that has a closest similarity to the second context $I_2$ 130. In this way, the first model 122 can be initialized with parameters whose corresponding image, scene, environment, etc. is the most similar to the new image, scene, environment, etc. To illustrate, the second model 124 can more effectively compute the adjustments in the parameters because the adjustments can be relatively smaller due to the similarity of the corresponding contexts. In some embodiments, if none of the stored sets of parameters corresponds to a context that is sufficiently similar to the new context by a threshold amount, the processor 190 not use the parameter inference operation 154 and can instead train the first model 122 from scratch using conventional training 608.

Further, the starting parameter set selection operation 606 can be performed in a centralized or decentralized manner. To illustrate, starting parameter set selection in a centralized manner can be performed using cloud-based processing or split-based processing (e.g., both cloud-based processing and processing on the device 102). Starting parameter set selection in a decentralized manner can be performed on the device 102. Determining whether to perform starting parameter set selection in a centralized manner or in a decentralized manner can be based on use-case, or based on power, compute, or timing criteria, or a combination thereof.

As illustrated, the memory 120 stores the gallery 620 of stored parameter sets associated with various contexts. Each entry 622 of the gallery 620 includes, for a particular context 630, a parameter set (PS) 632, feature descriptors (FD) 634, and may optionally include a second resolution parameter set (SR-PS) 636. In particular, the gallery 620 includes an entry 622A that includes a parameter set “a” (PSa) for a context “a,” an entry 622B includes a parameter set “b” (PSb) for a context “b,” and one or more additional entries, including an entry 622F that includes a parameter set “f” (PSf) for a context “f.” Each of the parameter sets PSa-PSf can correspond to a set of weights for the first model 122 to perform prediction for a particular context. To illustrate, one of the parameter sets PSa-PSf corresponds to the first set of parameters $\theta_1$ 128 to perform prediction for the first context 126.

The similarity measure 612 that is used to identify a context that is most similar to the second context $I_2$ 130 can be based on a set of extracted feature descriptors 634 associated with the multiple contexts 630 and an extracted feature descriptor associated with the second context $I_2$ 130. For example, the entry 622A in the gallery 620 includes a feature descriptor FDa for context “a,” the entry 622B includes a feature descriptor FDb for context “b,” and the entry 622F includes a feature descriptor FDf for context “f.” The feature descriptors may correspond to one or more of: a scene type, an object type, a location, a latent space representation of one or more features, a pixel space representation of one or more features, features obtained via a large language model, or descriptors obtained via a large language model, as non-limiting examples. In an illustrative implementation, the similarity measure 612 can be based on a distance (e.g., Euclidean distance) between the extracted feature descriptor for $I_2$ 130 and each of the feature descriptors FDa-FDf.

In an example, the processor 190 can determine that the feature descriptor FDb is the most similar to (i.e., the least distance from) the extracted feature descriptor for the second context 130 (e.g., the second context 130 is determined to be most similar to context “b”). The processor 190 therefore selects, as the first set of parameters $\theta_1$ 128, the stored parameter set PSb that corresponds to the identified particular context “b” as a starting point for generating the updated parameters $\theta_2$ 134.

In some cases, instead of selecting one of the parameter sets 632 from the memory 120, the processor 190 can retrieve a parameter set 632 from a remote collection of parameter sets at a remote device, such as the remote device 602 that stores the gallery 650. The gallery 650 includes an entry 622G that includes a parameter set “g” (PSg) and a feature descriptor “g” (FDg) for a context “g,” an entry 622H that includes a parameter set “h” (PSh) and a feature descriptor “h” (FDh) for a context “h,” and one or more additional entries, including an entry 622X that includes a parameter set "x" (PSx) and a feature descriptor "x" for a context "x." For example, the processor 190 may access the remote collection of parameter sets at the remote server (e.g., the gallery 650 at the remote device 602), via the communication network 604, to obtain the first set of parameters $\theta_1$ 128 based on the closest similarity of the parameter sets 632 stored at the local memory 120 failing to satisfy a threshold similarity to the second context 130.

In an illustrative embodiment, if the gallery 620 in the memory 120 does not include a parameter set 632 for a context 630 for which the similarity measure 612 satisfies (e.g., equals or exceeds) a threshold similarity, the remote gallery 650 may also be searched. However, in some time-sensitive applications (e.g., when the context $I_2$ 130 corresponds to sensor data of an autonomous vehicle), an amount of delay that may be incurred due to latency associated with searching the remote gallery 650 and retrieving a set of parameters via the communication network 604 may be considered unacceptable. In such cases, the device 102 (e.g., the processor 190) can select whether to access the remote gallery 650 at least partially based on a timing criterion associated with updating the first model 122.

In some implementations, satisfying a timing criterion for generating the updated model $f_{\theta 2}$ 148 may have higher priority than ensuring that updated model $f_{\theta 2}$ 148 provides a high-resolution, high-accuracy prediction of the second context $I_2$ 130. In such implementations, the updated model $f_{\theta 2}$ 148 may be generated using the "silhouette" or second resolution parameter sets 636 that correspond to a lower resolution than the full-resolution parameter sets 632. For example, the gallery 620 can include, in each particular entry 622A-622F, a particular context of the multiple contexts "a"-"m," a first resolution parameter set (PS) configured to enable inference of the particular context at a first resolution; a second resolution parameter set (SR-PS) configured to enable inference of the particular context at a reduced resolution; and a feature descriptor (FD) for the particular context. The processor 190 can thus be configured to use the second resolution parameter set (SR-PS) of the particular context as the first set of parameters $\theta_1$ 138 and, after performing the updated weight prediction using the second model 124, the updated model $f_{\theta 2}$ 148 is configured to perform inference corresponding to the second context $I_2$ 130 at the reduced resolution. For example, the reduced resolution may be used while the processor 190 generates an updated model using a full-resolution parameter set 632, such as via performing the parameter inference operation 154, performing the parameter inference operation 154 followed by iterations the conventional training 608, or performing cycles of the parameter inference operation 154 alternating with iterations of the conventional training 608, as described above.

In some embodiments, the updated model 148 may be generated according to a reduced-latency adjustment process in which inference of the second model 124 is restricted to adjusting only particular parameters of a set of parameters for the first model 122. To illustrate, in various example described above, the second model 124 considers all of the parameters of the first model 122. However, not all of the parameters within a neural network contribute to the overall performance as they typically operate in an over-parameterized regime. By identifying the most prominent parameters, the second model 124 can be restricted to adjusting only those most prominent parameter values, which can improve the efficiency of the second model 124 in generating the updated set of parameters 134. In some embodiments, prominent parameters of a neural network can be determined generally via a parameter saliency map based on determining, for one fixed input, gradients with respect to the weights to determine sensitivity of the weights for a target task, such as image classification.

Figure 7:
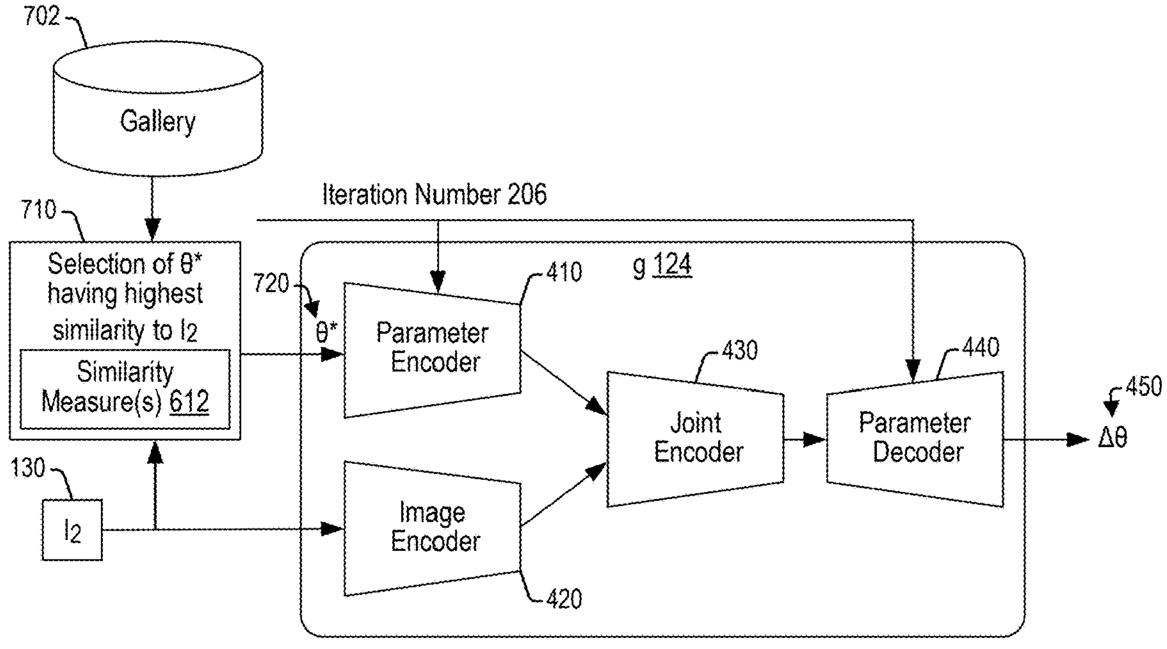
FIG. 7 is a block diagram illustrating an example of components that can be implemented in a system operable to use a ML model to update another ML model, in accordance with some examples of the present disclosure.

FIG. 7 depicts an example of components and operations that can be implemented in the device 102, the system 100 of FIG. 1, or the system 600 of FIG. 6 as illustrative, non-limiting examples.

In FIG. 7, a selection operation 710 is used to select a context from a gallery 702 based on a similarity to the second context $I_2$ 130, and a set of parameters corresponding to the selected context are input to the second model 124. In a particular embodiment, the gallery 702 corresponds to the gallery 620 in the memory 120 of the device 102 of FIG. 6, a remote gallery, such as the gallery 650 in the remote device 602, or a combination thereof.

The second model 124 includes the parameter encoder 410 that encodes a set of input parameters, the context encoder 420 (e.g., illustrated as an image encoder 420) that encodes information corresponding to a context, the joint encoder 430 that encodes the outputs of the parameter encoder 410 and the image encoder 420, and the parameter decoder 440 that generates an adjustment value $\Delta\theta$ 450 based on the output of the joint encoder 430, as described previously with reference to FIG. 4. As illustrated, information corresponding to the second context $I_2$ 130 (e.g., pixel data) is provided to the image encoder 420 and is also input to the selection operation 710.

The selection operation 710 searches the gallery 702 to identify a particular parameter set, denoted $\theta^*$ 720, that has highest similarity to (least distance from) the second context $I_2$ 130. For example, the selection operation 710 may be used during the starting parameter set selection operation 606 of FIG. 6 and may select the parameter set $\theta^*$ 720 by computing, for each set of parameters in the gallery 702, a similarity (e.g., the similarity measure 612) between the second context $I_2$ 130 and the context associated with that set of parameters. The set of parameters resulting in the highest similarity is selected as the parameter set $\theta^*$ 720 and input to the parameter encoder 410 for a first iteration step of the parameter inference operation 154.

In a particular embodiment, the parameter set $\theta^*$ 720 is selected according to the expression:

$$\theta^*: d(f_{\theta^*}(\bar{x},\bar{y}),I_2) \leq d(f_{\theta}(\bar{x},\bar{y}),I_2),\ \forall\theta\in\text{Gallery},$$

where d( . . . ) is a distance function that can be computed in pixel space, latent space of an auto-encoder (e.g., a feature extractor latent), LLM features and/or LLM description, meta-information (e.g., what kind of scene is it, what object is being viewed, if interior space, what are the furniture there, location, etc.) or any combination thereof. The set of parameters $\theta$ resulting in the smallest value of the distance function d, indicating the smallest distance from, or highest similarity to, the second context $I_2$ 130, is selected as the parameter set $\theta^*$ 720.

FIG. 8 depicts an example of components that can be implemented in the second model 124 to enable a streamlined parameter adjustment by separating an input parameter set, illustrated as the first set of parameters 128, based on the network layers of the first model 122. This enables the impact of irrelevant parameters on each other to be limited. For example, since the first model 122 includes multiple network layers, the second model 124 can be configured to include, for each of the multiple network layers of the first model 122, a corresponding instance of the parameter encoder 410, the joint encoder 430, and the parameter decoder 440 configured to generate an output 132 associated with that network layer of the first model 122. Although the present description references "layers" of the first model 122, it should be understood that each such "layer" may alternatively refer to a group of two or more layers, such as a functional block, of the first model 122.

In the illustrative embodiment of FIG. 8, the second model 124 includes a first row 810A that includes a first layer parameter encoder 410A, a first layer joint encoder 430A, and a first layer parameter decoder 440A associated with a first (e.g., lowest, or initial) layer of a corresponding first model 122; a second row 810B that includes a second layer parameter encoder 410B, a second layer joint encoder 430B, and a second layer parameter decoder 440B associated with a second layer of the first model 122; a third row 810C that includes a third layer parameter encoder 410C, a third layer joint encoder 430C, and a third layer parameter decoder 440C associated with a third layer of the first model 122; and one or more additional rows 810 including an Nth row 810N that includes an Nth layer parameter encoder 410N, an Nth layer joint encoder 430N, and an Nth layer parameter decoder 440N associated with an Nth (e.g., highest, or final) layer of the first model 122, where N is a positive integer corresponding to the number of layers in the first model 122.

In the first row 810A, the first layer parameter encoder 410A is configured to receive first layer parameters $\theta_{L1}$ 128A and the iteration number 206. The first layer parameters $\theta_{L1}$ 128A correspond to a subset of the first parameters 128 and include weights and/or biases associated with the first layer of the first model 122. The output of the first layer parameter encoder 410A and the output of the context encoder 420 (e.g., an image encoder 420) are input to the first layer joint encoder 430A. An output of the first layer joint encoder 430A and the iteration number 206 are input to the first layer parameter decoder 440A, which outputs a first layer adjustment value $\Delta\theta_{L1}$ 132A. The first layer adjustment value $\Delta\theta_{L1}$ 132A indicates adjustments to be made to the first layer parameters $\theta_{L1}$ 128A.

Each of the remaining rows 810B-810N operate in a substantially similar manner as described with reference to the first row 810A: the second row 810B receives second layer parameters $\theta_{L2}$ 128B and outputs a second layer adjustment value $\Delta\theta_{L2}$ 132B, the third row 810C receives third layer parameters $\theta_{L3}$ 128C and outputs a second layer adjustment value $\Delta\theta_{L3}$ 132C, and the Nth row 810N receives Nth layer parameters $\theta_{LN}$ 128N and outputs an Nth layer adjustment value $\Delta\theta_{LN}$ 132N. However, each of the rows 810B-810N also receives information from one or more other rows 810 to simulate the information flow within the first model 122.

For example, in a particular embodiment, the rows 810 corresponding to the lower layers of the first model 122 (e.g., row 810A) impact the rows 810 corresponding to higher layers (e.g., rows 810B-810N) by implementing connections from the parameter and joint encoders from the rows 810 corresponding the lower layers to joint and parameter decoders of the rows 810 corresponding to the higher layers, without implementing such connections int the other direction (e.g., from the parameter and joint encoders from the rows 810 corresponding the higher layers to joint and parameter decoders of the rows 810 corresponding to the lower layers). This is illustrated in FIG. 8 as connections from the output of the layer 1 joint encoder 430A to the input of the layer 2 joint encoder 430B, the output of the layer 2 joint encoder 430B to the input of the layer 3 joint encoder 430C, etc.

By simulating the information flow of the first model 122, the second model 124 of FIG. 8 can reduce the impact of parameters for higher levels upon the parameters for lower layers, which can enable more effective and/or efficient training of the second model 124 and can result in more accurate outputs 132.

Figures 9A, 9B:
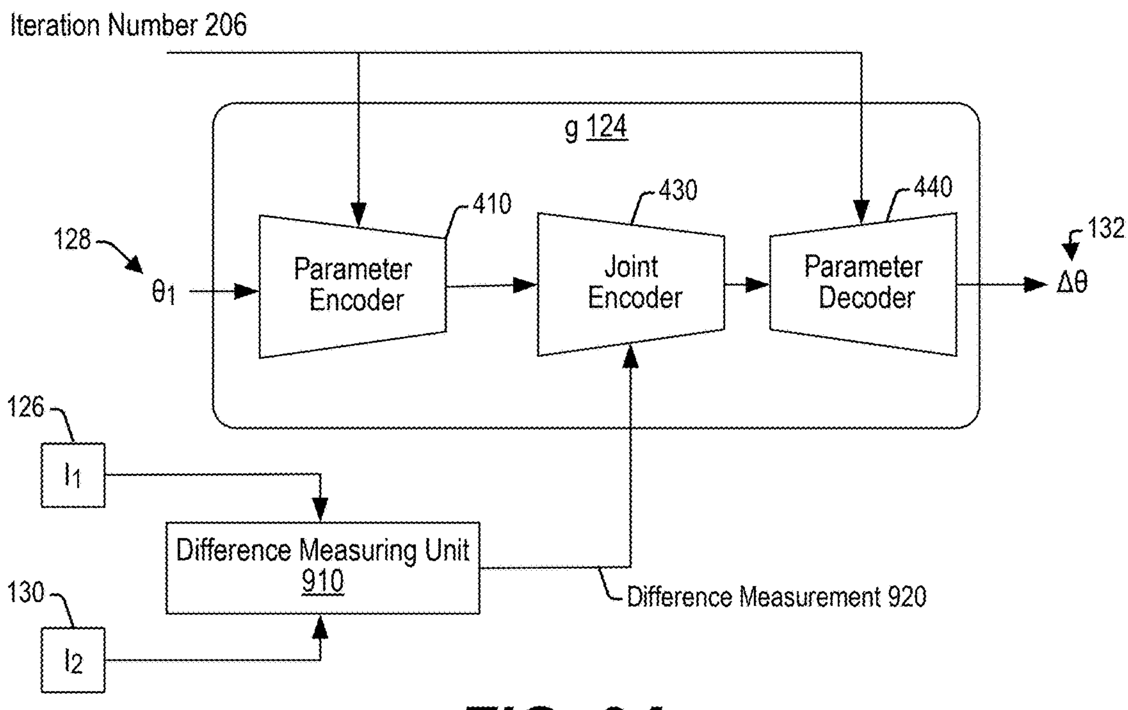
FIGS. 9A and 9B are block diagrams illustrating examples of components that can be implemented in a system operable to use a ML model to update another ML model, in accordance with some examples of the present disclosure.

FIGS. 9A and 9B illustrate examples of components that can be included in the device 102, the system 100 of FIG. 1, or the system 600 of FIG. 6, as illustrative, non-limiting examples. In the examples of FIGS. 9A and 9B, the second model 124 is configured to generate the output 132 at least partially based on a difference between the first context 126 associated with the first model 122 and the second context 130.

In FIG. 9A, the second model 124 includes the parameter encoder 410, the joint encoder 430, and the parameter decoder 440 of FIG. 4. The second model 124 omits the context encoder 420 and instead receives context-based input in the form of a difference measurement 920 received from a difference measuring unit 910.

The difference measuring unit 910 receives information associated with the first context 126 and information associated with the second context 130 and computes the difference measurement 920. In some embodiments, the difference measuring unit 910 performs a direct comparison of the first context 126 and the second context 130 to determine the difference measurement 920. For example, in an embodiment in which the first context 126 and the second context 130 correspond to images, the difference measuring unit 910 may subtract one of the images from the other of the images, and the difference measurement 920 can correspond to a difference image. In some embodiments, the difference measuring unit 910 includes one or more encoders, and the difference measurement 920 can correspond to a difference in the latent space of the one or more encoders. For example, in an embodiment in which the first context 126 and the second context 130 correspond to images, the one or more encoders can function as feature extractors that extract features from each image, and the difference measurement 920 can indicate differences between the features of each image.

The difference measurement 920 is input, along with the output of the parameter encoder 410, into the joint encoder 430. As a result, the second model 124 generates the output 132 based on the difference measurement 920 of the first context 126 to the second context 130. Because the difference measurement 920 provides information to the second model 124 as to where the points of difference between the first context 126 and the second context 130 are, the second model 124 can generate the output 132 (e.g., adjustment values for the first set of parameters 128) more efficiently and/or more accurately than in implementations in which the differences between the first context 126 and the second context 130 are not taken into account.

Although the difference measuring unit 910 is described as performing a direct comparison of the received inputs, or as encoding the received inputs to compare differences in extracted features, in other embodiments the difference measuring unit 910 may generate the difference measurement 920 using one or more other techniques. For example, the difference measuring unit 910 may include or be coupled to a large language model LLM that describes differences between the two inputs. To illustrate, an output of the LLM may include a textual description of the differences, which may be translated by the difference measuring unit 910 into a latent space or otherwise processed via one or more intermediate operations at the difference measuring unit 910 to convert the textual description into embeddings that can be input to the joint encoder 430.

FIG. 9B depicts another embodiment in which the second model 124 includes a first context encoder 420A (e.g., a first image encoder 420A) and a second context encoder 420B (e.g., a second image encoder 420B). The first context encoder 420A is configured to encode input corresponding to the first context 126 and the second context encoder 420B is configured to encode input corresponding to the second context 130.

Outputs of each of the context encoders 420A, 420B are provided as inputs, along with the output of the parameter encoder 410, to the joint encoder 430. Thus, the second model 124 is configured to generate the output 132 based on input corresponding to the first context 126 as well as based on input corresponding to the second context 130. The second model 124 (e.g., the joint encoder 430) may be configured to compare features of the first context 126 and the second context 130 and translate that comparison into generating the output 132 to tune the parameters 128.

As previously discussed, it should be understood that although the contexts 126 and 130 are described as images in various examples, the contexts 126 and 130 can generally refer to any measurement, feature, or meta-information about respective environments and are not limited to images. Additionally, although the embodiments of FIGS. 9A and 9B can generally be used in conjunction with various embodiments described above, use of the embodiments of FIGS. 9A and 9B in conjunction with the previously described technique of interleaving cycles of the parameter inference operation 154 with cycles of conventional training iterations may negatively impact performance since each time a subsequent cycle of the parameter inference operation 154 commences, the context 130 associated with the updated weights—that is, the environment encapsulated by the first model 122 after completing a cycle of conventional training iterations—has to be recomputed, which can be computationally expensive.

According to an aspect, the various components shown in FIGS. 2A-9B are illustrated to assist with understanding the operations performed by processor(s) 190 in accordance with some embodiments. The components may be implemented in one or more processors or in processing circuitry, such as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Figure 10:
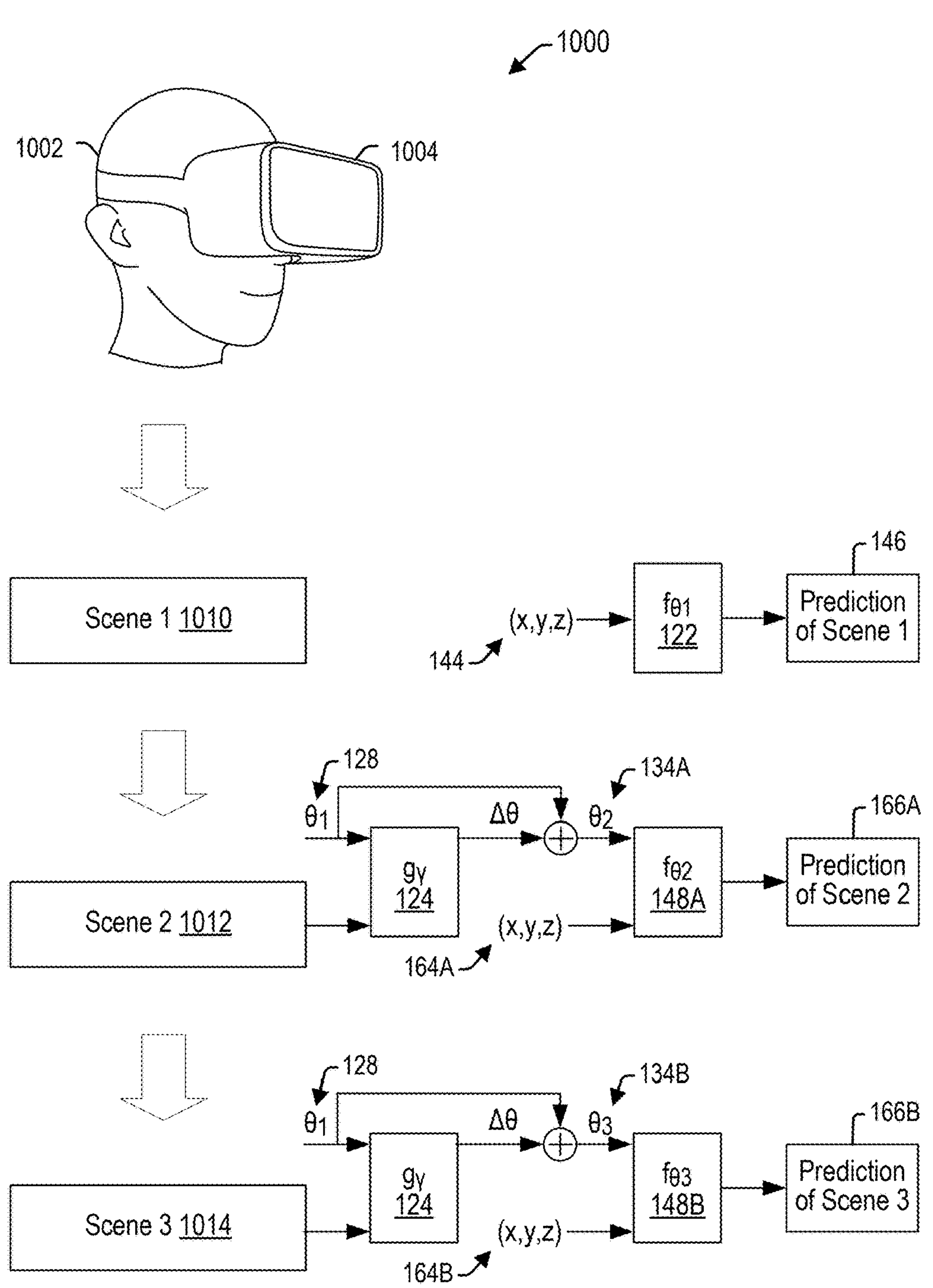
FIG. 10 is a diagram illustrating an example of components and operations that can be implemented in a system operable to use a ML model to update another ML model, in accordance with some examples of the present disclosure.

FIG. 10 depicts an example 1000 of components and operations that can be used in conjunction with the device 102 in a use case in which the device 102 is implemented in an extended reality (XR) head mounted device (HMD) 1004 worn by a user 1002. As used herein, XR can include virtual reality (VR), mixed reality (MR), or augmented reality (AR), as illustrative examples.

In the example 1000, the HMD 1004 has "learned" surfaces in a certain environment, depicted as a first scene 1010. To illustrate, the HMD 1004 includes the first model 122 that is configured use the first set of parameters $\theta_1$ 128 to perform inference for a coordinate input 144, such as (x, y, z) coordinates, to generate a resulting prediction 146 corresponding to a view of the first scene 1010. For example, the first scene 1010 can correspond to a first room, such as a room in a museum. In this example, the first scene 1010 corresponds to the first context 126 of FIG. 1.

The HMD 1004 may next encounter a new scene, depicted as a second scene 1012. For example, the user 1002 may walk from the first room of the museum into a second room of the museum, which may be similar to the first room but may have different pieces of artwork and a different organization of furniture than the first room. The HMD 1004 captures multiple images of the second scene 1012, via one or more cameras of the HMD 1004 and as the user 1002 moves relative to the second scene 1012. The HMD 1004 also stores pose information, such as 6-degrees of freedom (DoF) pose information, associated with each of the captured images and use the multi-view images and the associated pose information to reconstruct the second scene 1012. In a particular embodiment, input corresponding to the second scene 1012 (e.g., the second context 130) and the first set of parameters $\theta_1$ 128 associated with the first model 122 are provided to the second model 124, which generates an updated set of parameters $\theta_2$ 134A. The input corresponding to the second scene 1012 that is provided to the second model 124 can include the multi-view images and pose information captured by the HMD 1004, or can include a 3D reconstruction created by the HMD 1004 based on the multi-view images and pose information (e.g., using a truncated signed distance function (TSDF)), or can correspond to semantical information (e.g., descriptions generated by a LLM) that is extracted from the multi-view images and pose information, as illustrative, non-limiting examples.

Generating the updated set of parameters 134A includes performing one or more inference operations at the second model 124 to generate a set of adjustment values $\Delta\theta$, and the set of adjustment values $\Delta\theta$ are applied to the first set of parameters $\theta_1$ 128 to generate an updated set of parameters $\theta_2$ 134A, such as described with reference to FIG. 2A. In some embodiments, the one or more inference operations at the second model 124 may be followed by additional iterations of conventional training, or interleaved with one or more cycles of conventional training iterations, until an inference accuracy of the updated first model 148A reaches an accuracy threshold, such as described with reference to FIG. 5. After generating the updated first model 148A that uses the updated set of parameters $\theta_2$ 134A for the second scene 1012, the HMD 1004 uses the updated first model 148A to perform inference based on coordinate inputs 164A to generate predictions 166A that enable the HMD 1004 to represent the second scene 1012 for the user 1002.

After generating the updated first model 148A corresponding to the second scene 1012, the HMD 1004 may next encounter another new scene, depicted as a third scene 1014. For example, the user 1002 may walk from the second room of the museum into a third room of the museum, which may also be similar to the first room but may have different pieces of artwork and a different organization of furniture than the first or second rooms. The HMD 1004 captures multiple images of the third scene 1014 and corresponding pose information, via one or more cameras of the HMD 1004 and as the user 1002 moves relative to the third scene 1014, and uses the multi-view images and the associated pose information to reconstruct the third scene 1014. In a particular embodiment, input corresponding to the third scene 1014 and the first set of parameters $\theta_1$ 128 associated with the first model 122 are provided to the second model 124, which generates another updated set of parameters $\theta_3$ 134B in a similar manner as described for the generating the updated set of parameters $\theta_2$ 134A. After generating an updated first model 148B that uses the updated set of parameters $\theta_3$ 134B for the third scene 1014, the HMD 1004 uses the updated first model 148B to perform inference based on coordinate inputs 164B to generate predictions 166B that enable the HMD 1004 to represent the third scene 1014 for the user 1002.

Figure 11:
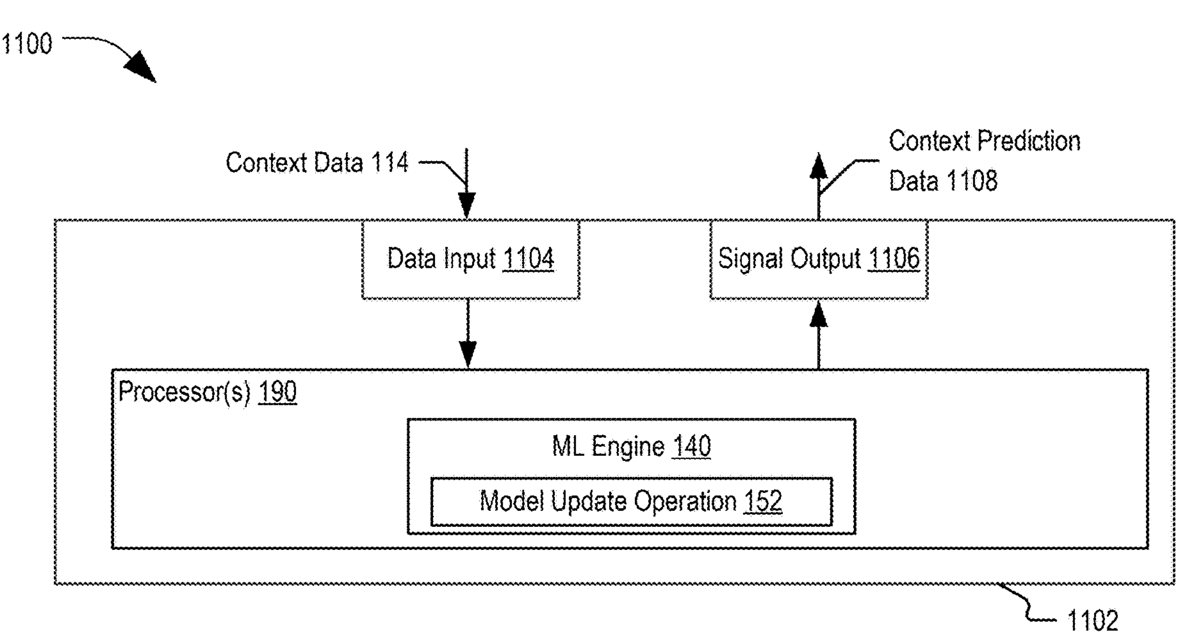
FIG. 11 is a diagram of an example of an integrated circuit operable to use a ML model to update another ML model, in accordance with some examples of the present disclosure.
Figure 15:
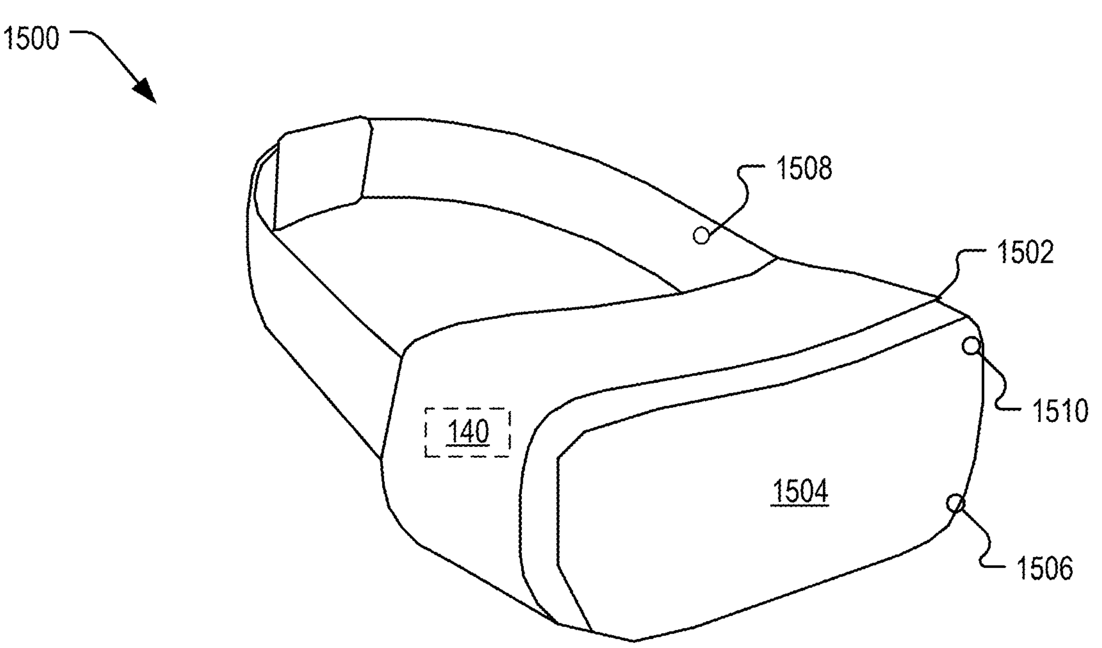
FIG. 15 is a diagram of a headset, such as a virtual reality, mixed reality, or augmented reality headset, operable to use a ML model to update another ML model, in accordance with some examples of the present disclosure.
Figure 16:
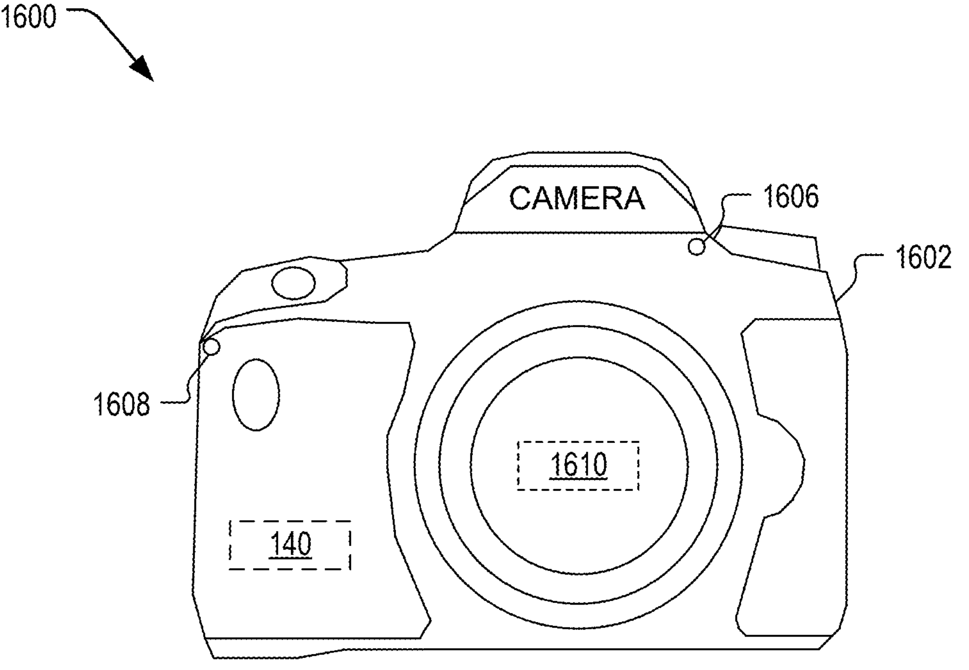
FIG. 16 is a diagram of a camera operable to use a ML model to update another ML model, in accordance with some examples of the present disclosure.
Figure 17:
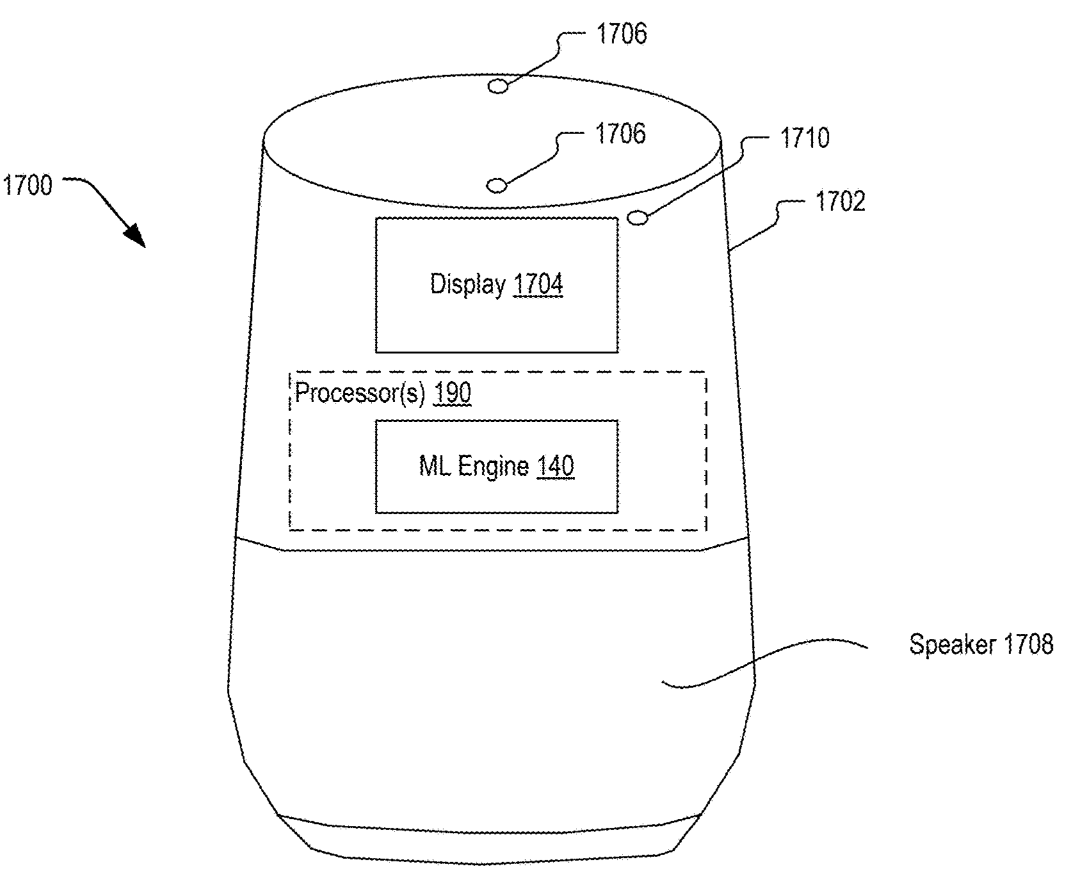
FIG. 17 is a diagram of a voice-controlled speaker system operable to use a ML model to update another ML model, in accordance with some examples of the present disclosure.
Figure 18:
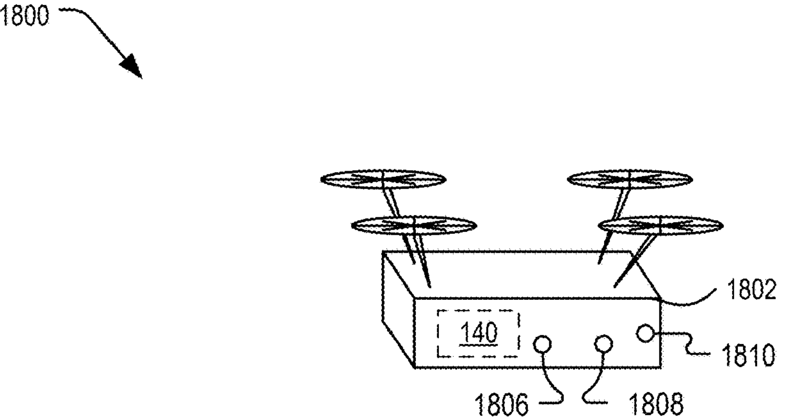
FIG. 18 is a diagram of a first example of a vehicle operable to use a ML model to update another ML model, in accordance with some examples of the present disclosure.
Figure 19:
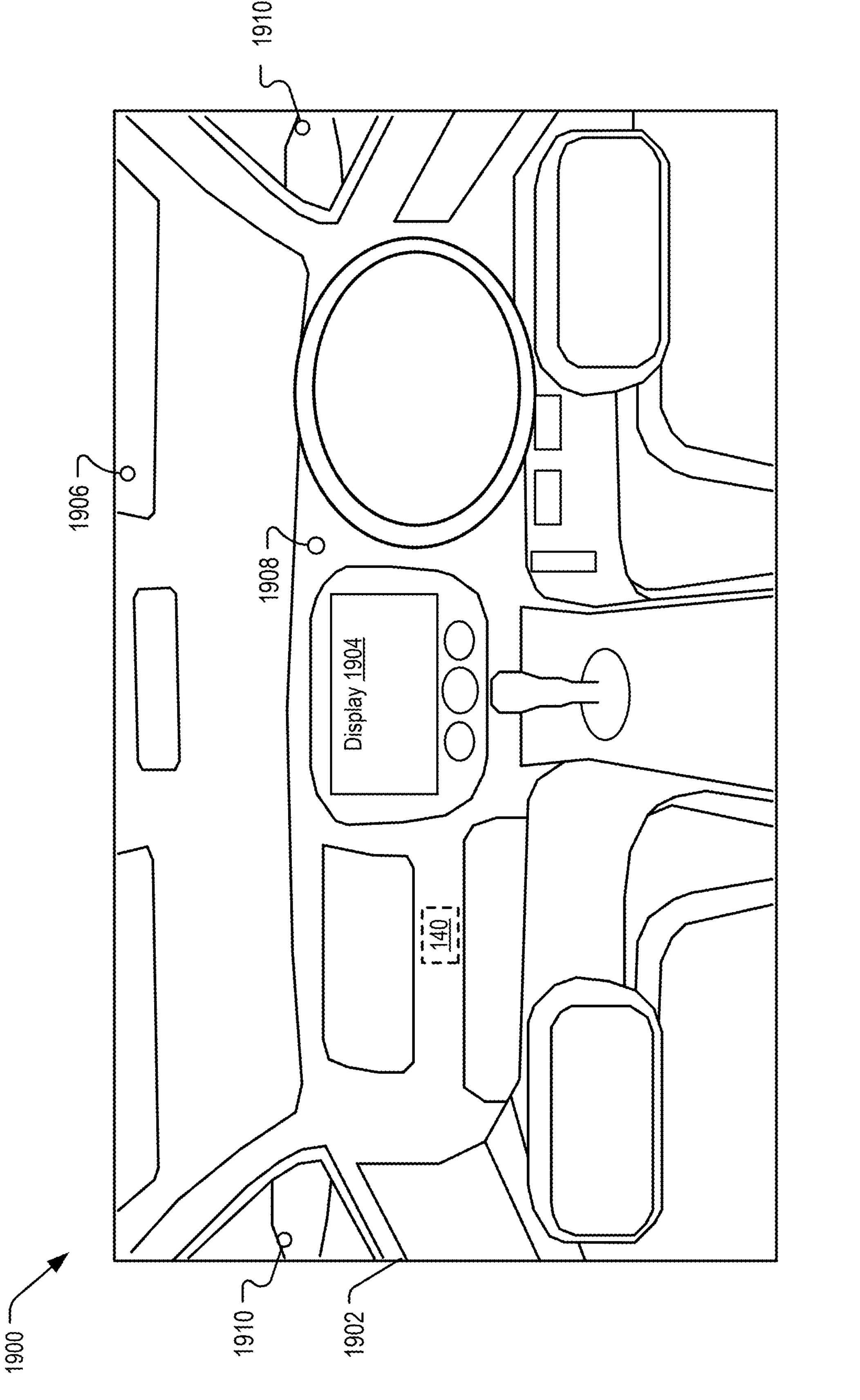
FIG. 19 is a diagram of a second example of a vehicle operable to use a ML model to update another ML model, in accordance with some examples of the present disclosure.

FIG. 11 depicts an implementation 1100 of the device 102 as an integrated circuit 1102 that includes the one or more processors 190. The integrated circuit 1102 also includes a data input 1104, such as one or more bus interfaces, to enable the context data 114 (e.g., information associated with the second context 130) to be received for processing. The integrated circuit 1102 also includes a signal output 1106, such as a bus interface, to enable sending of an output signal, such as context prediction data 1108. As an example, the context prediction data 1108 can correspond to or include the first context predictions 146, the second context predictions 166, or both, of FIG. 1. The integrated circuit 1102 including the ML engine 140 enables implementation of using an ML model to update another ML model as a component in a system, such as a mobile phone or tablet as depicted in FIG. 12, a wearable electronic device as depicted in FIG. 13, a mixed reality or augmented reality glasses device, as described with reference to FIG. 14, a virtual reality, mixed reality, or augmented reality headset as depicted in FIG. 15, a camera as depicted in FIG. 16, a voice-controlled speaker system as depicted in FIG. 17, or a vehicle as depicted in FIG. 18 or FIG. 19.

Figure 12:
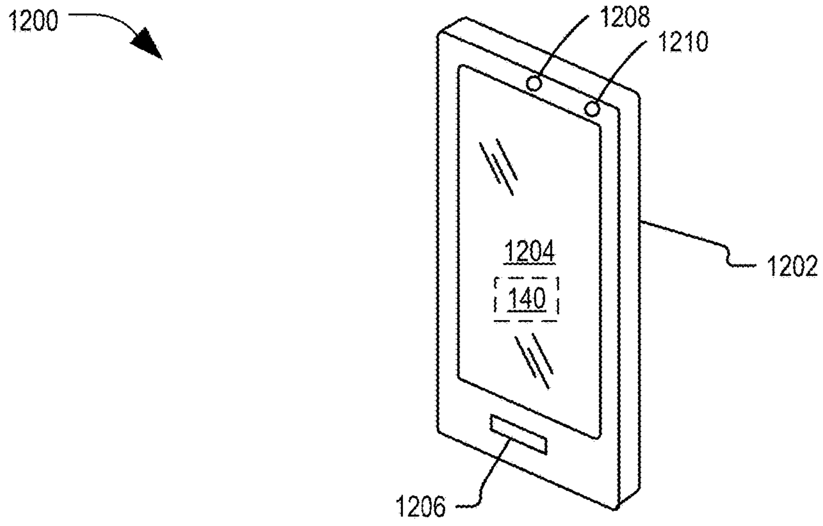
FIG. 12 is a diagram of a mobile device operable to use a ML model to update another ML model, in accordance with some examples of the present disclosure.

FIG. 12 depicts an implementation 1200 in which the device 102 includes a mobile device 1202, such as a phone or tablet, as illustrative, non-limiting examples. The mobile device 1202 includes one or more microphones 1206, one or more speakers 1208, one or more cameras 1210, and a display screen 1204. Components of the processor 190, including the ML engine 140, are integrated in the mobile device 1202 and are illustrated using dashed lines to indicate internal components that are not generally visible to a user of the mobile device 1202. In a particular example, the ML engine 140 is operable to obtain, via the camera 1210 or from a remote device, input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and output the image data for display at the display screen 1204. Using the second model to update the parameters of the first model enables the mobile device 1202 to efficiently (in terms of latency, computing resources, and power) generate an updated first model capable of generating accurate predictions corresponding to the particular context.

Figure 13:
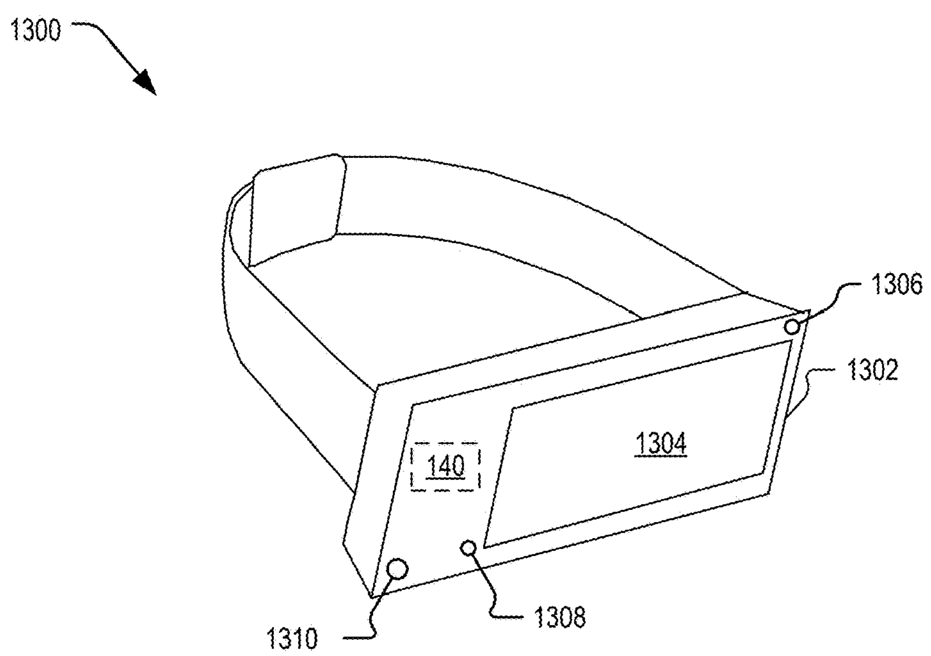
FIG. 13 is a diagram of a wearable electronic device operable to use a ML model to update another ML model, in accordance with some examples of the present disclosure.

FIG. 13 depicts an implementation 1300 in which the device 102 includes a wearable electronic device 1302, illustrated as a "smart watch." The wearable electronic device 102 includes a display screen 1304, one or more microphones 1306, one or more speakers 1308, and one or more cameras 1310. Components of the processor 190, including the ML engine 140, are integrated in the wearable electronic device 1302. In a particular example, the ML engine 140 is operable to obtain, via the camera 1310 or from a remote device, input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and output the image data for display at the display screen 1304. Using the second model to update the parameters of the first model enables the wearable electronic device 1302 to efficiently (in terms of latency, computing resources, and power) generate an updated first model capable of generating accurate predictions corresponding to the particular context. In some embodiments, the wearable electronic device 1302 is configured to generate a notification based on the particular context. For example, the display screen 1304 can generate visual information associated with the image data generated using the updated first model. As another example, the wearable electronic device 1302 can include a haptic device that provides a haptic notification (e.g., vibrates) based on content of the predictions made using the updated first model.

Figure 14:
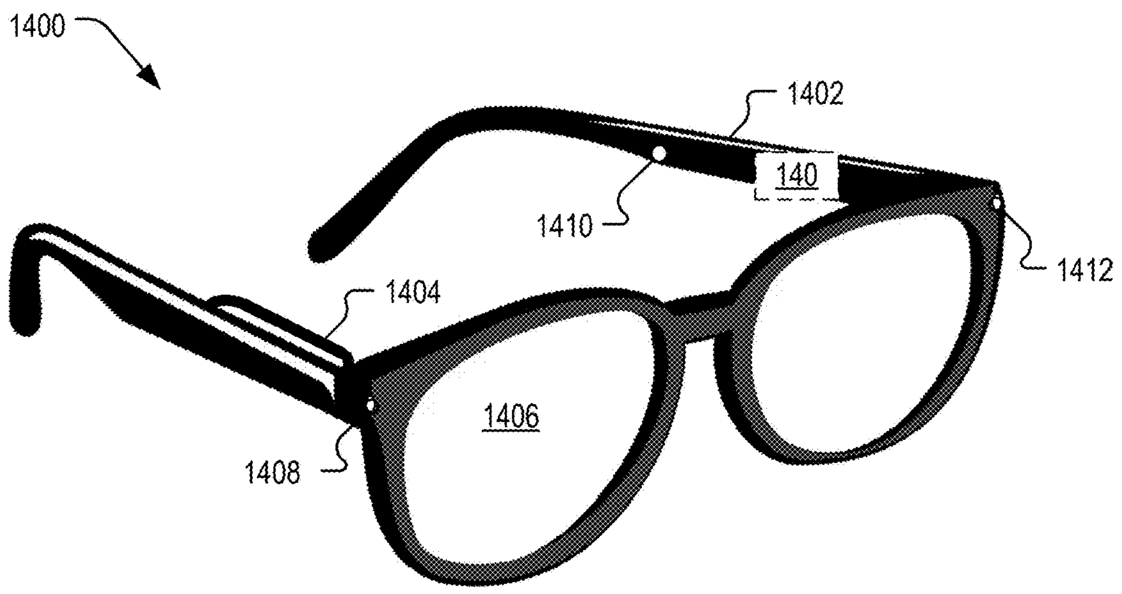
FIG. 14 is a diagram of a mixed reality or augmented reality glasses device operable to use a ML model to update another ML model, in accordance with some examples of the present disclosure.

FIG. 14 depicts an implementation 1400 in which the device 102 includes a portable electronic device that corresponds to augmented reality or mixed reality glasses 1402. The glasses 1402 include a holographic projection unit 1404 configured to project visual data onto a surface of a lens 1406 or to reflect the visual data off of a surface of the lens 1406 and onto the wearer's retina. The glasses 1402 also include one or more microphones 1408, one or more speakers 1410, and one or more cameras 1412. Components of the processor 190, including the ML engine 140, are integrated in the glasses 1402. In a particular example, the ML engine 140 is operable to obtain, via the camera 1412 or from a remote device, input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and output the image data to the holographic projection unit 1404 for display to a wearer of the glasses 1402. Using the second model to update the parameters of the first model enables the glasses 1402 to efficiently (in terms of latency, computing resources, and power) generate an updated first model capable of generating accurate predictions corresponding to the particular context.

FIG. 15 depicts an implementation 1500 in which the device 102 includes a portable electronic device that corresponds to a virtual reality, mixed reality, or augmented reality headset 1502. A visual interface device 1504 is positioned in front of the user's eyes to enable display of augmented reality, mixed reality, or virtual reality images or scenes to the user while the headset 1502 is worn. The headset 1502 also includes one or more microphones 1506, one or more speakers 1508, and one or more cameras 1510. Components of the processor 190, including the ML engine 140, are integrated in the headset 1502. In a particular example, the ML engine 140 is operable to obtain, via the camera 1510 or from a remote device, input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and output the image data to the visual interface device 1504 for display to a wearer of the headset 1502. Using the second model to update the parameters of the first model enables the headset 1502 to efficiently (in terms of latency, computing resources, and power) generate an updated first model capable of generating accurate predictions corresponding to the particular context.

FIG. 16 depicts an implementation 1600 in which the device 102 includes a portable electronic device that corresponds to a camera device 1602. The camera device 1602 includes one or more microphones 1606, one or more speakers 1608, and one or more image sensors 1610. Components of the processor 190, including the ML engine 140, are integrated in the camera device 1602. In a particular example, the ML engine 140 is operable to obtain, via the image sensor 1610 or from a remote device, input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and store the image data to a memory or to a remote device, output the image data to a display screen of the camera device 1602 for display to a user of the camera device 1602, or a combination thereof. Using the second model to update the parameters of the first model enables the camera device 1602 to efficiently (in terms of latency, computing resources, and power) generate an updated first model capable of generating accurate predictions corresponding to the particular context.

FIG. 17 is an implementation 1700 in which the device 102 includes a wireless speaker and voice activated device 1702. The wireless speaker and voice activated device 1702 can have wireless network connectivity and is configured to execute an assistant operation. The wireless speaker and voice activated device 1702 includes one or more microphones 1706, one or more speakers 1708, one or more cameras 1710, and a display screen 1704. Components of the processor 190, including the ML engine 140, are integrated in the wireless speaker and voice activated device 1702. In a particular example, the ML engine 140 is operable to obtain, via the camera 1710 or from a remote device, input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and store the image data to a memory or to a remote device, output the image data to the display screen 1704 for display to a user of the wireless speaker and voice activated device 1702, or a combination thereof. Using the second model to update the parameters of the first model enables the wireless speaker and voice activated device 1702 to efficiently (in terms of latency, computing resources, and power) generate an updated first model capable of generating accurate predictions corresponding to the particular context.

FIG. 18 depicts an implementation 1800 in which the device 102 corresponds to, or is integrated within, a vehicle 1802, illustrated as a manned or unmanned aerial device (e.g., a package delivery drone). The vehicle 1802 includes one or more microphones 1806, one or more speakers 1808, and one or more cameras 1810. Components of the processor 190, including the ML engine 140, are integrated in the vehicle 1802. In a particular example, the ML engine 140 is operable to obtain, via the camera 1810 or from a remote device (e.g., a remote navigation system), input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and store the image data to a memory, send the image data to the remote device, output the image data to a display screen for display to a user of the vehicle 1802, or a combination thereof. Using the second model to update the parameters of the first model enables the vehicle 1802 to efficiently (in terms of latency, computing resources, and power) generate an updated first model capable of generating accurate predictions corresponding to the particular context. For example, images captured by the camera 1810 can be used to generate updated models that are capable of generating novel views of the environment around the vehicle 1802, which may be provided to an operator of the vehicle 1802 for navigation assistance.

FIG. 19 depicts another implementation 1900 in which the device 102 corresponds to, or is integrated within, a vehicle 1902, illustrated as a car. The vehicle 1902 includes a display screen 1904, one or more microphones 1906, one or more speakers 1908, and one or more cameras 1910 (e.g., forward-facing cameras, rear-facing cameras, or cameras having any other orientation or field of view for use with navigation, assisted driving operation, or autonomous driving operations). Components of the processor 190, including the ML engine 140, are integrated in the vehicle 1902.

In a particular example, the ML engine 140 is operable to obtain, via the camera 1910 or from a remote device (e.g., a remote navigation system), input corresponding to a particular context. The ML engine 140 is operable to perform a model update operation using a second model, a first set of parameters associated with a first model, and the input corresponding to the particular context to generate an updated set of parameters, and update the first model to perform inference using the updated set of parameters. The ML engine 140 can generate image data based on predictions made using the updated first model and store the image data to a memory, send the image data to the remote device, output the image data to a display screen for display to a user of the vehicle 1902, or a combination thereof. Using the second model to update the parameters of the first model enables the vehicle 1902 to efficiently (in terms of latency, computing resources, and power) generate an updated first model capable of generating accurate predictions corresponding to the particular context. For example, images captured by the camera 1910 can be used to generate updated models that are capable of generating novel views of the environment around the vehicle 1902, which may be provided to an operator of the vehicle 1902 for navigation assistance.

In some embodiments the vehicle 1802 of FIG. 18, the vehicle 1902 of FIG. 19, one or more other devices such as a robot, etc., may support operator-assisted or autonomous operation in which one or more techniques are used to generate updated models with minimal delay. For example, the vehicle or robot may use the "silhouette" or second resolution parameter sets 636 that correspond to a lower resolution than the full-resolution parameter sets 632, as described in FIG. 6, to more quickly train a lower-resolution but functional model for more immediate use, such as while a full-resolution model is being generated in parallel. In addition, or alternatively, the vehicle or robot may restrict parameter adjustment to the parameters determined to be the most prominent parameters, to further reduce the delay associated with generating the updated model. In such implementation, the vehicle or robot may perform a hierarchy of operations based on allowable latency to complete the operations. For example, an estimate may be made as to how much time would be required to identify and update a local set of model parameters (e.g., from the gallery 620) as compared to how much time would be required to access, identify, retrieve, and update a remote set of model parameters (e.g., from the gallery 650). Such estimation may be further stratified based latency associated with identifying, retrieving, and updating a silhouette parameter set 636 as compared to a full-resolution parameter set 632, and/or based on restricting training to the most prominent parameters. If an estimated latency to generate an updated model exceeds a timing criterion associated with a particular operation that would use the updated model, the vehicle or robot may be configured to make operational decisions—such as collision avoidance maneuvering—in place of generating an updated model, or while generation of an updated model is ongoing, to ensure safe operation of the vehicle or robot.

Figure 20:
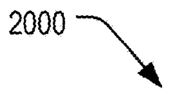
FIG. 20 is a diagram of an example of a method of using a ML model to update another ML model, in accordance with some examples of the present disclosure.
Figure 20:
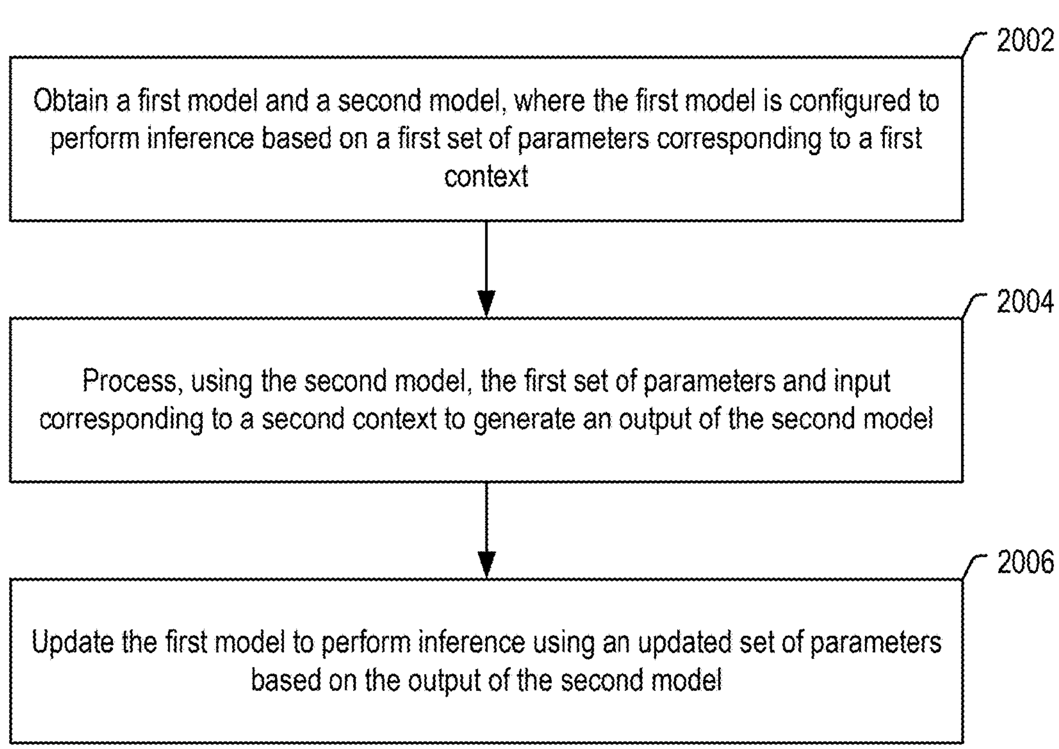

Referring to FIG. 20, a particular implementation of a method 2000 of using a ML model to update another ML model is shown. In a particular embodiment, one or more operations of the method 2000 are performed by at least one of the ML engine 140, the processor 190, the device 102, the system 100 of FIG. 1, or a combination thereof.

In some embodiments, the method 2000 includes, at block 2002, obtaining a first model and a second model, where the first model is configured to perform inference based on a first set of parameters corresponding to a first context. For example, the ML engine 140 of FIG. 1 obtains the first model 122 and the second model 124, and the first model 122 is configured to perform inference based on the first set of parameters 128 corresponding to the first context 126. In some embodiments, the first context corresponds to a 2D or 3D representation of a first scene or a first 3D object, and the second context corresponds to a 2D or 3D representation of a second scene or a second 3D object.

The method 2000 includes, at block 2004, processing, using the second model, the first set of parameters and input corresponding to a second context to generate an output of the second model. For example, the ML engine 140 processes the first set of parameters 128 and input corresponding to the second context 130, using the second model 124, to generate the output 132 of the second model 124.

The method 2000 includes, at block 2006, updating the first model to perform inference using an updated set of parameters based on the output of the second model. For example, the ML engine 140 updates the first model 122 to perform inference using an updated set of parameters 134, resulting in the updated first model 148, and the updated set of parameters 134 is based on the output 132 of the second model 124. For example, the updated set of parameters 134 can be output by the second model 124 as described with reference to FIG. 2B, or can be generated based on a set of adjustment values that are output by the second model 124 as described with reference to FIG. 2A.

Optionally, the method 2000 includes accessing a collection of stored parameter sets corresponding to multiple contexts for the first model. For example, the processor 190 may access the stored parameter sets in the gallery 620, the gallery 650, or both, of FIG. 6. The method 2000 may include identifying, based on a similarity measure (e.g., the similarity measure 612), a particular context of the multiple contexts that has a closest similarity to the second context, and selecting, as the first set of parameters, the stored parameter set that corresponds to the identified particular context, such as described with reference to the starting parameter set selection operation 606 of FIG. 6.

The method 2000 of FIG. 20 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 2000 of FIG. 20 may be performed by a processor that executes instructions, such as described with reference to FIG. 21.

Figure 21:
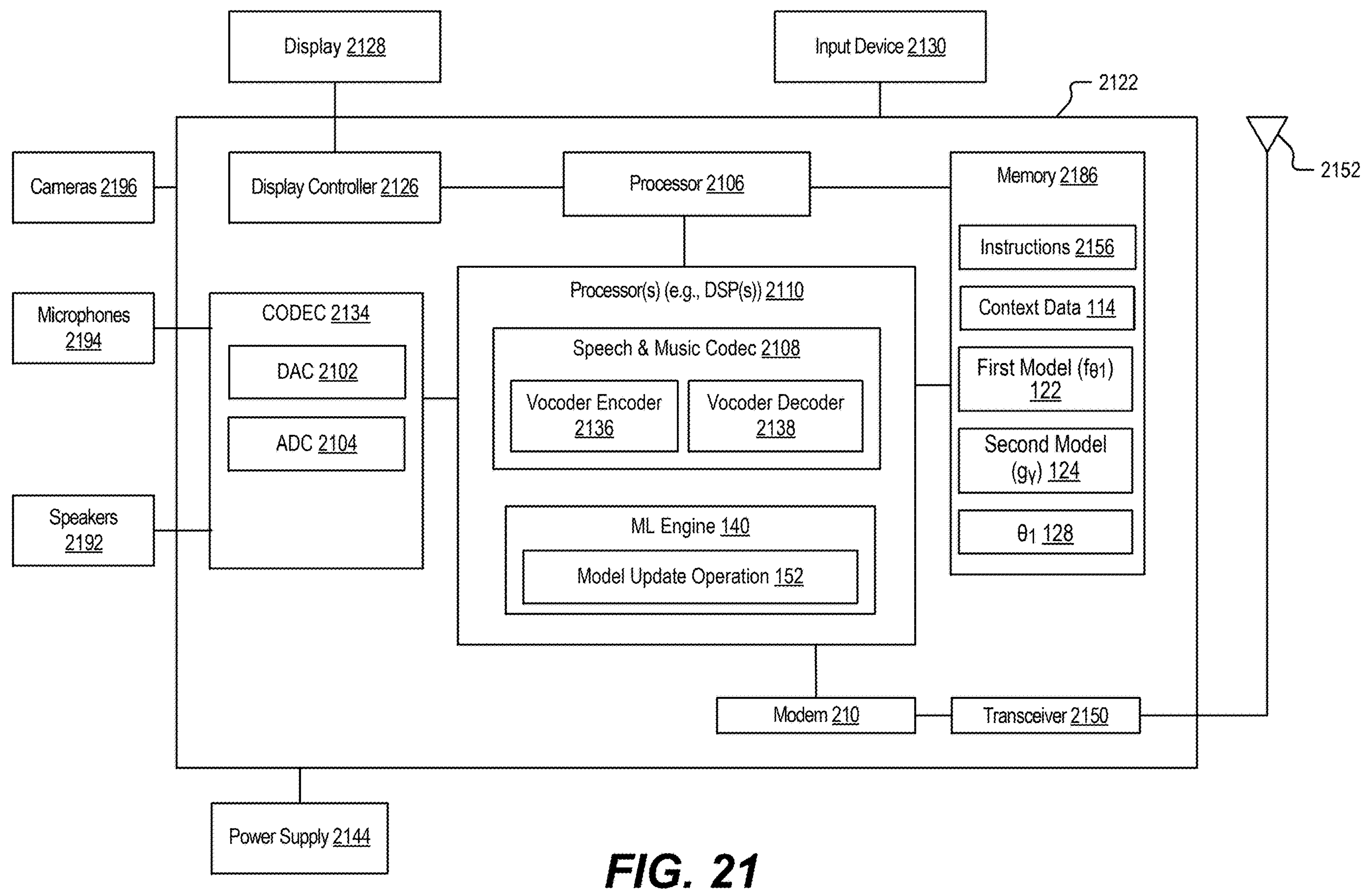
FIG. 21 is a block diagram of a particular illustrative example of a device that is operable to use a ML model to update another ML model, in accordance with some examples of the present disclosure.

Referring to FIG. 21, a block diagram of a particular illustrative implementation of a device is depicted and generally designated 2100. In various implementations, the device 2100 may have more or fewer components than illustrated in FIG. 21. In an illustrative implementation, the device 2100 may correspond to the device 102. In an illustrative implementation, the device 2100 may perform one or more operations described with reference to FIGS. 1-20.

In a particular implementation, the device 2100 includes a processor 2106 (e.g., a central processing unit (CPU)). The device 2100 may include one or more additional processors 2110 (e.g., one or more DSPs). In a particular aspect, the processor 190 of FIG. 1 corresponds to the processor 2106, the processors 2110, or a combination thereof. The processors 2110 may include a speech and music coder-decoder (CODEC) 2108 that includes a voice coder ("vocoder") encoder 2136, a vocoder decoder 2138, the ML engine 140, or a combination thereof.

In this context, the term "processor" refers to an integrated circuit consisting of logic cells, interconnects, input/output blocks, clock management components, memory, and optionally other special purpose hardware components, designed to execute instructions and perform various computational tasks. Examples of processors include, without limitation, central processing units (CPUs), digital signal processors (DSPs), neural processing units (NPU), graphics processing units (GPUs), field programmable gate arrays (FPGAs), microcontrollers, quantum processors, coprocessors, vector processors, other similar circuits, and variants and combinations thereof. In some cases, a processor can be integrated with other components, such as communication components, input/output components, etc. to form a system on a chip (SOC) device or a packaged electronic device.

Taking CPUs as a starting point, a CPU typically includes one or more processor cores, each of which includes a complex, interconnected network of transistors and other circuit components defining logic gates, memory elements, etc. A core is responsible for executing instructions to, for example, perform arithmetic and logical operations. Typically, a CPU includes an Arithmetic Logic Unit (ALU) that handles mathematical operations and a Control Unit that generates signals to coordinate the operation of other CPU components, such as to manage operations a fetch-decode-execute cycle.

CPUs and/or individual processor cores generally include local memory circuits, such as registers and cache to temporarily store data during operations. Registers include high-speed, small-sized memory units intimately connected to the logic cells of a CPU. Often registers include transistors arranged as groups of flip-flops, which are configured to store binary data. Caches include fast, on-chip memory circuits used to store frequently accessed data. Caches can be implemented, for example, using Static Random-Access Memory (SRAM) circuits.

Operations of a CPU (e.g., arithmetic operations, logic operations, and flow control operations) are directed by software and firmware. At the lowest level, the CPU includes an instruction set architecture (ISA) that specifies how individual operations are performed using hardware resources (e.g., registers, arithmetic units, etc.). Higher level software and firmware is translated into various combinations of ISA operations to cause the CPU to perform specific higher-level operations. For example, an ISA typically specifies how the hardware components of the CPU move and modify data to perform operations such as addition, multiplication, and subtraction, and high-level software is translated into sets of such operations to accomplish larger tasks, such as adding two columns in a spreadsheet. Generally, a CPU operates on various levels of software, including a kernel, an operating system, applications, and so forth, with each higher level of software generally being more abstracted from the ISA and usually more readily understandable by human users.

GPUs, NPUs, DSPs, microcontrollers, coprocessors, FPGAs, ASICS, and vector processors include components similar to those described above for CPUs. The differences among these various types of processors are generally related to the use of specialized interconnection schemes and ISAs to improve a processor's ability to perform particular types of operations. For example, the logic gates, local memory circuits, and the interconnects therebetween of a GPU are specifically designed to improve parallel processing, sharing of data between processor cores, and vector operations, and the ISA of the GPU may define operations that take advantage of these structures. As another example, ASICs are highly specialized processors that include similar circuitry arranged and interconnected for a particular task, such as encryption or signal processing. As yet another example, FPGAs are programmable devices that include an array of configurable logic blocks (e.g., interconnect sets of transistors and memory elements) that can be configured (often on the fly) to perform customizable logic functions.

The device 2100 may include a memory 2186 and a CODEC 2134. The memory 2186 may include instructions 2156, that are executable by the one or more additional processors 2110 (or the processor 2106) to implement the functionality described with reference to the ML engine 140, or both. The memory 2186 may also include data corresponding to the context data 114, the first model 122, the second model 124, the set of parameters 128, or other data associated with operation of the ML engine 140. In a particular embodiment, the memory 2186 corresponds to the memory 120 of FIG. 1. The device 2100 may include the modem 170 coupled, via a transceiver 2150, to an antenna 2152.

The device 2100 may include a display 2128 coupled to a display controller 2126. One or more speakers 2192 and microphone(s) 2194 may be coupled to the CODEC 2134. The CODEC 2134 may include a digital-to-analog converter (DAC) 2102, an analog-to-digital converter (ADC) 2104, or both. In a particular implementation, the CODEC 2134 may receive analog signals from the microphone(s) 2194, convert the analog signals to digital signals using the analog-to-digital converter 2104, and provide the digital signals to the speech and music codec 2108. The speech and music codec 2108 may process the digital signals. In a particular implementation, the speech and music codec 2108 may provide digital signals to the CODEC 2134. The CODEC 2134 may convert the digital signals to analog signals using the digital-to-analog converter 2102 and may provide the analog signals to the speaker 2192.

In a particular implementation, the device 2100 may be included in a system-in-package or system-on-chip device 2122. In a particular implementation, the memory 2186, the processor 2106, the processors 2110, the display controller 2126, the CODEC 2134, and the modem 170 are included in the system-in-package or system-on-chip device 2122. In a particular implementation, an input device 2130, a power supply 2144, and one or more cameras 2196 are coupled to the system-in-package or the system-on-chip device 2122. Moreover, in a particular implementation, as illustrated in FIG. 21, the display 2128, the input device 2130, the speaker(s) 2192, the microphone(s) 2194, the camera(s) 2196, the antenna 2152, and the power supply 2144 are external to the system-in-package or the system-on-chip device 2122. In a particular implementation, each of the display 2128, the input device 2130, the speaker(s) 2192, the microphone(s) 2194, the camera(s) 2196, the antenna 2152, and the power supply 2144 may be coupled to a component of the system-in-package or the system-on-chip device 2122, such as an interface or a controller.

The device 2100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for obtaining a first model and a second model, where the first model is configured to perform inference based on a first set of parameters corresponding to a first context. For example, the means for means for obtaining a first model and a second model can include the device 102, the modem 170, the processor(s) 190, the ML engine 140, the integrated circuit 1102, the processor 2106, the processor(s) 2110, the system-in-package or the system-on-chip device 2122, the device 2100, other circuitry configured to obtain a first model and a second model, or a combination thereof.

The apparatus also includes means for processing, using the second model, the first set of parameters and input corresponding to a second context to generate an output of the second model. For example, the means for processing, using the second model, the first set of parameters and input corresponding to a second context to generate an output of the second model can include the device 102, the processor (s) 190, the ML engine 140, the integrated circuit 1102, the processor 2106, the processor(s) 2110, the system-in-package or the system-on-chip device 2122, the device 2100, other circuitry configured to process, using the second model, the first set of parameters and input corresponding to a second context to generate an output of the second model, or a combination thereof.

The apparatus also includes means for means for updating the first model to perform inference using an updated set of parameters based on the output of the second model. For example, the means for means for updating the first model to perform inference using an updated set of parameters based on the output of the second model can include the device 102, the processor(s) 190, the ML engine 140, the integrated circuit 1102, the processor 2106, the processor(s) 2110, the system-in-package or the system-on-chip device 2122, the device 2100, other circuitry configured to update the first model to perform inference using an updated set of parameters based on the output of the second model, or a combination thereof.

In some implementations, a non-transitory computer-readable medium (e.g., a computer-readable storage device, such as the memory 2186) includes instructions (e.g., the instructions 2156) that, when executed by one or more processors (e.g., the one or more processors 2110 or the processor 2106), cause the one or more processors to obtain a first model (e.g., the first model 122) and a second model (e.g., the second model 124), wherein the first model is configured to perform inference based on a first set of parameters (e.g., the first set of parameters 128) corresponding to a first context (e.g., the first context 126). The instructions, when executed by one or more processors, also cause the one or more processors to process, using the second model, the first set of parameters and input corresponding to a second context to generate an output (e.g., the output 132) of the second model 124, and to update the first model to perform inference using an updated set of parameters (e.g., the updated set of parameters 134) based on the output of the second model.

Particular aspects of the disclosure are described below in sets of interrelated Examples:

According to Example 1, a device includes a memory configured to store a first model and a second model, wherein the first model is configured to perform inference based on a first set of parameters corresponding to a first context; and one or more processors configured to process, using the second model, the first set of parameters and input corresponding to a second context to generate an output of the second model; and update the first model to perform inference using an updated set of parameters based on the output of the second model.

Example 2 includes the device of Example 1, wherein the first context corresponds to a 2-dimensional (2D) or 3-dimensional (3D) representation of a first scene or a first 3D object, and wherein the second context corresponds to a 2D or 3D representation of a second scene or a second 3D object.

Example 3 includes the device of Example 1 or Example 2, wherein the first model corresponds to a neural radiance field (NeRF) model.

Example 4 includes the device of any of Examples 1 to 3, wherein generation of the output of the second model includes performance of multiple iterations of inference at the second model.

Example 5 includes the device of any of Examples 1 to 4, wherein the output of the second model includes the updated set of parameters, or a set of adjustment values to apply to the first set of parameters to generate the updated set of parameters.

Example 6 includes the device of any of Examples 1 to 5, wherein the one or more processors are configured to access a collection of stored parameter sets corresponding to multiple contexts for the first model; and identify, based on a similarity measure, a particular context of the multiple contexts that has a closest similarity to the second context.

Example 7 includes the device of Example 6, wherein the similarity measure is based on a set of extracted feature descriptors associated with the multiple contexts and an extracted feature descriptor associated with the second context.

Example 8 includes the device of Example 7, wherein the feature descriptors correspond to one or more of: a scene type, an object type, a location, features obtained via a large language model, or descriptors obtained via a large language model.

Example 9 includes the device of any of Examples 6 to 8, wherein the one or more processors are configured to select, as the first set of parameters, the stored parameter set that corresponds to the identified particular context.

Example 10 includes the device of any of Examples 6 to 9, wherein the collection of stored parameter sets is stored in the memory, and wherein the one or more processors are configured to, based on the closest similarity failing to satisfy a threshold similarity, access a remote collection of parameter sets via a communication network to obtain the first set of parameters.

Example 11 includes the device of Example 10, wherein the one or more processors are configured to select whether to access the remote collection at least partially based on a timing criteria associated with updating the first model.

Example 12 includes the device of any of Examples 6 to 11, wherein:

the collection of stored parameter sets further includes, for each particular context of the multiple contexts: a first resolution parameter set configured to enable inference of the particular context at a first resolution; a second resolution parameter set configured to enable inference of the particular context at a reduced resolution; and a feature descriptor for the particular context; the one or more processors are configured to use the second resolution parameter set of the particular context as the first set of parameters; and the updated first model is configured to perform inference corresponding to the second context at the reduced resolution.

Example 13 includes the device of any of Examples 1 to 12 wherein, after the first model is updated based on the output of the second model, the one or more processors are further configured to perform one or more training operations on the updated first model to enhance an inference accuracy of the updated first model for the second context.

Example 14 includes the device of Example 13, wherein the one or more training operations are performed until the inference accuracy reaches an accuracy threshold.

Example 15 includes the device of Example 13, wherein the one or more processors are configured to alternate between parameter updates using training operations and parameter updates using the second model until the inference accuracy reaches an accuracy threshold.

Example 16 includes the device of any of Examples 1 to 15, wherein the second model is configured to generate the output further based on input corresponding to the first context.

Example 17 includes the device of any of Examples 1 to 16, wherein the second model is configured to generate the output based on a difference measurement of the first context to the second context.

Example 18 includes the device of any of Examples 1 to 17, wherein the second model includes: a parameter encoder configured to process an input set of parameters; a context encoder configured to process the input corresponding to a second context; a joint encoder configured to process outputs of the parameter encoder and the context encoder; and a parameter decoder configured to process an output of the joint encoder to generate the output.

Example 19 includes the device of any of Examples 1 to 18, wherein: the first model includes multiple network layers; and the second model includes, for each of the multiple network layers of the first model, a corresponding instance of a parameter encoder, a joint encoder, and a parameter decoder configured to generate an output associated with that network layer of the first model.

Example 20 includes the device of any of Examples 1 to 19 and further includes a camera configured to generate context data associated with the second context.

Example 21 includes the device of any of Examples 1 to 20 and further includes a modem coupled to the one or more processors and configured to receive the first model, the second model, the first set of parameters, or a combination thereof, from a remote device.

Example 22 includes the device of any of Examples 1 to 21 and further includes a display device configured to display image data generated using the updated first model.

Example 23 includes the device of any of Examples 1 to 22, wherein the one or more processors are integrated in at least one of a virtual reality headset, a mixed reality headset, or an augmented reality headset.

Example 24 includes the device of any of Examples 1 to 22, wherein the one or more processors are integrated in a vehicle, the vehicle further including a camera configured to generate context data associated with the second context.

Example 25 includes the device of any of Examples 1 to 24, wherein the one or more processors are included in an integrated circuit.

According to Example 26, a method includes obtaining a first model and a second model, wherein the first model is configured to perform inference based on a first set of parameters corresponding to a first context; processing, using the second model, the first set of parameters and input corresponding to a second context to generate an output of the second model; and updating the first model to perform inference using an updated set of parameters based on the output of the second model.

Example 27 includes the method of Example 26, wherein the first context corresponds to a 2-dimensional (2D) or 3-dimensional (3D) representation of a first scene or a first 3D object, and wherein the second context corresponds to a 2D or 3D representation of a second scene or a second 3D object.

Example 28 includes the method of Example 26 or Example 27, wherein the first model corresponds to a neural radiance field (NeRF) model.

Example 29 includes the method of any of Examples 26 to 28, wherein generation of the output of the second model includes performing multiple iterations of inference at the second model.

Example 30 includes the method of any of Examples 26 to 29, wherein the output of the second model includes the updated set of parameters, or a set of adjustment values to apply to the first set of parameters to generate the updated set of parameters.

Example 31 includes the method of any of Examples 26 to 30, and further includes accessing a collection of stored parameter sets corresponding to multiple contexts for the first model; and identifying, based on a similarity measure, a particular context of the multiple contexts that has a closest similarity to the second context.

Example 32 includes the method of Example 31, wherein the similarity measure is based on a set of extracted feature descriptors associated with the multiple contexts and an extracted feature descriptor associated with the second context.

Example 33 includes the method of Example 32, wherein the feature descriptors correspond to one or more of: a scene type, an object type, a location, features obtained via a large language model, or descriptors obtained via a large language model.

Example 34 includes the method of any of Examples 31 to 33 and further includes selecting, as the first set of parameters, the stored parameter set that corresponds to the identified particular context.

Example 35 includes the method of any of Examples 31 to 34 and further includes, based on the closest similarity failing to satisfy a threshold similarity, accessing a remote collection of parameter sets via a communication network to obtain the first set of parameters.

Example 36 includes the method of Example 35 and further includes selecting whether to access the remote collection at least partially based on a timing criteria associated with updating the first model.

Example 37 includes the method of any of Examples 31 to 36, wherein: the collection of stored parameter sets further includes, for each particular context of the multiple contexts: a first resolution parameter set configured to enable inference of the particular context at a first resolution; a second resolution parameter set configured to enable inference of the particular context at a reduced resolution; and a feature descriptor for the particular context; the second resolution parameter set of the particular context are used as the first set of parameters; and the updated first model performs inference corresponding to the second context at the reduced resolution.

Example 38 includes the method of any of Examples 26 to 37 and further includes, after the first model is updated based on the output of the second model, performing one or more training operations on the updated first model to enhance an inference accuracy of the updated first model for the second context.

Example 39 includes the method of Example 38, wherein the one or more training operations are performed until the inference accuracy reaches an accuracy threshold.

Example 40 includes the method of Example 38 and further includes alternating between parameter updates using training operations and parameter updates using the second model until the inference accuracy reaches an accuracy threshold.

Example 41 includes the method of any of Examples 26 to 40, wherein the second model is configured to generate the output further based on input corresponding to the first context.

Example 42 includes the method of any of Examples 26 to 41, wherein the second model is configured to generate the output based on a difference measurement of the first context to the second context.

Example 43 includes the method of any of Examples 26 to 42, wherein the second model includes: a parameter encoder configured to process an input set of parameters; a context encoder configured to process the input corresponding to a second context; a joint encoder configured to process outputs of the parameter encoder and the context encoder; and a parameter decoder configured to process an output of the joint encoder to generate the output.

Example 44 includes the method of any of Examples 26 to 43, wherein: the first model includes multiple network layers; and the second model includes, for each of the multiple network layers of the first model, a corresponding instance of a parameter encoder, a joint encoder, and a parameter decoder configured to generate an output associated with that network layer of the first model.

According to Example 45, a non-transitory computer-readable medium comprising instructions that, when executed by one or more processors, cause the one or more processors to obtain a first model and a second model, wherein the first model is configured to perform inference based on a first set of parameters corresponding to a first context; process, using the second model, the first set of parameters and input corresponding to a second context to generate an output of the second model; and update the first model to perform inference using an updated set of parameters based on the output of the second model.

Example 46 includes the non-transitory computer-readable medium of Example 45, wherein the first context corresponds to a 2-dimensional (2D) or 3-dimensional (3D) representation of a first scene or a first 2D object, and wherein the second context corresponds to a 2D or 3D representation of a second scene or a second 22D object.

Example 47 includes the non-transitory computer-readable medium of Example 45 or Example 46, wherein the first model corresponds to a neural radiance field (NeRF) model.

Example 48 includes the non-transitory computer-readable medium of any of Examples 45 to 47, wherein generation of the output of the second model includes performance of multiple iterations of inference at the second model.

Example 49 includes the non-transitory computer-readable medium of any of Examples 45 to 48, wherein the output of the second model includes the updated set of parameters, or a set of adjustment values to apply to the first set of parameters to generate the updated set of parameters.

Example 50 includes the non-transitory computer-readable medium of any of Examples 45 to 49, wherein the instructions, when executed by the one or more processors, further cause the one or more processors to access a collection of stored parameter sets corresponding to multiple contexts for the first model; and identify, based on a similarity measure, a particular context of the multiple contexts that has a closest similarity to the second context.

Example 51 includes the non-transitory computer-readable medium of Example 50, wherein the similarity measure is based on a set of extracted feature descriptors associated with the multiple contexts and an extracted feature descriptor associated with the second context.

Example 52 includes the non-transitory computer-readable medium of Example 51, wherein the feature descriptors correspond to one or more of: a scene type, an object type, a location, features obtained via a large language model, or descriptors obtained via a large language model.

Example 53 includes the non-transitory computer-readable medium of any of Examples 50 to 52, wherein the instructions, when executed by the one or more processors, further cause the one or more processors to select, as the first set of parameters, the stored parameter set that corresponds to the identified particular context.

Example 54 includes the non-transitory computer-readable medium of any of Examples 50 to 53, wherein the instructions, when executed by the one or more processors, further cause the one or more processors to, based on the closest similarity failing to satisfy a threshold similarity, access a remote collection of parameter sets via a communication network to obtain the first set of parameters.

Example 55 includes the non-transitory computer-readable medium of Example 54, wherein the instructions, when executed by the one or more processors, further cause the one or more processors to select whether to access the remote collection at least partially based on a timing criteria associated with updating the first model.

Example 56 includes the non-transitory computer-readable medium of any of Examples 50 to 55, wherein: the collection of stored parameter sets further includes, for each particular context of the multiple contexts: a first resolution parameter set configured to enable inference of the particular context at a first resolution; a second resolution parameter set configured to enable inference of the particular context at a reduced resolution; and a feature descriptor for the particular context; the second resolution parameter set of the particular context are used as the first set of parameters; and the updated first model performs inference corresponding to the second context at the reduced resolution.

Example 57 includes the non-transitory computer-readable medium of any of Examples 45 to 56, wherein the instructions, when executed by the one or more processors, further cause the one or more processors to, after the first model is updated based on the output of the second model, perform one or more training operations on the updated first model to enhance an inference accuracy of the updated first model for the second context.

Example 58 includes the non-transitory computer-readable medium of Example 57, wherein the one or more training operations are performed until the inference accuracy reaches an accuracy threshold.

Example 59 includes the non-transitory computer-readable medium of Example 57, wherein the instructions, when executed by the one or more processors, further cause the one or more processors to alternate between parameter updates using training operations and parameter updates using the second model until the inference accuracy reaches an accuracy threshold.

Example 60 includes the non-transitory computer-readable medium of any of Examples 45 to 59, wherein the second model is configured to generate the output further based on input corresponding to the first context.

Example 61 includes the non-transitory computer-readable medium of any of Examples 45 to 60, wherein the second model is configured to generate the output based on a difference measurement of the first context to the second context.

Example 62 includes the non-transitory computer-readable medium of any of Examples 45 to 61, wherein the second model includes: a parameter encoder configured to process an input set of parameters; a context encoder configured to process the input corresponding to a second context; a joint encoder configured to process outputs of the parameter encoder and the context encoder; and a parameter decoder configured to process an output of the joint encoder to generate the output.

Example 63 includes the non-transitory computer-readable medium of any of Examples 45 to 61, wherein: the first model includes multiple network layers; and the second model includes, for each of the multiple network layers of the first model, a corresponding instance of a parameter encoder, a joint encoder, and a parameter decoder configured to generate an output associated with that network layer of the first model.

According to Example 64, an apparatus includes means for obtaining a first model and a second model, wherein the first model is configured to perform inference based on a first set of parameters corresponding to a first context; means for processing, using the second model, the first set of parameters and input corresponding to a second context to generate an output of the second model; and means for updating the first model to perform inference using an updated set of parameters based on the output of the second model.

Example 65 includes the apparatus of Example 64, wherein the first context corresponds to a 2-dimensional (2D) or 3-dimensional (3D) representation of a first scene or a first 3D object, and wherein the second context corresponds to a 2D or 3D representation of a second scene or a second 3D object.

Example 66 includes the apparatus of Example 64 or Example 65, wherein the first model corresponds to a neural radiance field (NeRF) model.

Example 67 includes the apparatus of any of Examples 64 to 66, wherein generation of the output of the second model includes performing multiple iterations of inference at the second model.

Example 68 includes the apparatus of any of Examples 64 to 67, wherein the output of the second model includes the updated set of parameters, or a set of adjustment values to apply to the first set of parameters to generate the updated set of parameters.

Example 69 includes the apparatus of any of Examples 64 to 68, and further includes means for accessing a collection of stored parameter sets corresponding to multiple contexts for the first model; and means for identifying, based on a similarity measure, a particular context of the multiple contexts that has a closest similarity to the second context.

Example 70 includes the apparatus of Example 69, wherein the similarity measure is based on a set of extracted feature descriptors associated with the multiple contexts and an extracted feature descriptor associated with the second context.

Example 71 includes the apparatus of Example 70, wherein the feature descriptors correspond to one or more of: a scene type, an object type, a location, features obtained via a large language model, or descriptors obtained via a large language model.

Example 72 includes the apparatus of any of Examples 69 to 71, and further includes means for selecting, as the first set of parameters, the stored parameter set that corresponds to the identified particular context.

Example 73 includes the apparatus of any of Examples 69 to 72 and further includes means for, based on the closest similarity failing to satisfy a threshold similarity, accessing a remote collection of parameter sets via a communication network to obtain the first set of parameters.

Example 74 includes the apparatus of Examples 73, and further includes means for selecting whether to access the remote collection at least partially based on a timing criteria associated with updating the first model.

Example 75 includes the apparatus of any of Examples 69 to 74, wherein: the collection of stored parameter sets further includes, for each particular context of the multiple contexts: a first resolution parameter set configured to enable inference of the particular context at a first resolution; a second resolution parameter set configured to enable inference of the particular context at a reduced resolution; and a feature descriptor for the particular context; the second resolution parameter set of the particular context are used as the first set of parameters; and the updated first model performs inference corresponding to the second context at the reduced resolution.

Example 76 includes the apparatus of any of Examples 64 to 75, and further includes means for, after the first model is updated based on the output of the second model, performing one or more training operations on the updated first model to enhance an inference accuracy of the updated first model for the second context.

Example 77 includes the apparatus of Example 76, wherein the one or more training operations are performed until the inference accuracy reaches an accuracy threshold.

Example 78 includes the apparatus of Example 76, and further includes means for alternating between parameter updates using training operations and parameter updates using the second model until the inference accuracy reaches an accuracy threshold.

Example 79 includes the apparatus of any of Examples 64 to 78, wherein the second model is configured to generate the output further based on input corresponding to the first context.

Example 80 includes the apparatus of any of Examples 64 to 79, wherein the second model is configured to generate the output based on a difference measurement of the first context to the second context.

Example 81 includes the apparatus of any of Examples 64 to 80, wherein the second model includes: a parameter encoder configured to process an input set of parameters; a context encoder configured to process the input corresponding to a second context; a joint encoder configured to process outputs of the parameter encoder and the context encoder; and a parameter decoder configured to process an output of the joint encoder to generate the output.

Example 82 includes the apparatus of any of Examples 64 to 81, wherein: the first model includes multiple network layers; and the second model includes, for each of the multiple network layers of the first model, a corresponding instance of a parameter encoder, a joint encoder, and a parameter decoder configured to generate an output associated with that network layer of the first model.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a memory configured to store a first model and a second model, wherein the first model is configured to perform inference based on a first set of parameters corresponding to a first context, and wherein the second model enables updating the first set of parameters; and one or more processors configured to:

process, using the second model, first input corresponding to the first set of parameters and second input corresponding to a second context to generate an output of the second model; and update the first model to perform inference using an updated set of parameters based on the output of the second model.

2. The device of claim 1, wherein the first context corresponds to a 2-dimensional (2D) or 3-dimensional (3D) representation of a first scene or a first 3D object, and wherein the second context corresponds to a 2D or 3D representation of a second scene or a second 3D object.

3. The device of claim 1, wherein the first model corresponds to a neural radiance field (NeRF) model.

4. The device of claim 1, wherein generation of the output of the second model includes performance of multiple iterations of inference at the second model.

5. The device of claim 1, wherein the output of the second model includes the updated set of parameters, or a set of adjustment values to apply to the first set of parameters to generate the updated set of parameters.

6. The device of claim 1, wherein the one or more processors are configured to:

access a collection of stored parameter sets corresponding to multiple contexts for the first model; and identify, based on a similarity measure, a particular context of the multiple contexts that has a closest similarity to the second context.

7. The device of claim 6, wherein the similarity measure is based on a set of extracted feature descriptors associated with the multiple contexts and an extracted feature descriptor associated with the second context.

8. The device of claim 7, wherein the feature descriptors correspond to one or more of: a scene type, an object type, a location, features obtained via a large language model, or descriptors obtained via a large language model.

9. The device of claim 6, wherein the one or more processors are configured to select, as the first set of parameters, the stored parameter set that corresponds to the identified particular context.

10. The device of claim 6, wherein the collection of stored parameter sets is stored in the memory, and wherein the one or more processors are configured to, based on the closest similarity failing to satisfy a threshold similarity, access a remote collection of parameter sets via a communication network to obtain the first set of parameters.

11. The device of claim 10, wherein the one or more processors are configured to select whether to access the remote collection at least partially based on a timing criteria associated with updating the first model.

12. The device of claim 6, wherein:

the collection of stored parameter sets further includes, for each particular context of the multiple contexts:

a first resolution parameter set configured to enable inference of the particular context at a first resolution;

a second resolution parameter set configured to enable inference of the particular context at a reduced resolution; and a feature descriptor for the particular context;

the one or more processors are configured to use the second resolution parameter set of the particular context as the first set of parameters; and the updated first model is configured to perform inference corresponding to the second context at the reduced resolution.

13. The device of claim 1 wherein, after the first model is updated based on the output of the second model, the one or more processors are further configured to perform one or more training operations on the updated first model to enhance an inference accuracy of the updated first model for the second context.

14. The device of claim 13, wherein the one or more training operations are performed until the inference accuracy reaches an accuracy threshold.

15. The device of claim 13, wherein the one or more processors are configured to alternate between parameter updates using training operations and parameter updates using the second model until the inference accuracy reaches an accuracy threshold.

16. The device of claim 1, the second model is configured to generate the output based on a difference measurement of the first context to the second context.

17. The device of claim 1, wherein the second model includes:

a parameter encoder configured to process an input set of parameters;

a context encoder configured to process the input corresponding to a second context;

a joint encoder configured to process outputs of the parameter encoder and the context encoder; and a parameter decoder configured to process an output of the joint encoder to generate the output.

18. The device of claim 1, wherein:

the first model includes multiple network layers; and the second model includes, for each of the multiple network layers of the first model, a corresponding instance of a parameter encoder, a joint encoder, and a parameter decoder configured to generate an output associated with that network layer of the first model.

19. The device of claim 1, further comprising a camera configured to generate context data associated with the second context.

20. The device of claim 1, further comprising a modem coupled to the one or more processors and configured to receive the first model, the second model, the first set of parameters, or a combination thereof, from a remote device.

21. The device of claim 1, further comprising a display device configured to display image data generated using the updated first model.

22. A method comprising:

obtaining a first model and a second model, wherein the first model is configured to perform inference based on a first set of parameters corresponding to a first context, and wherein the second model enables updating the first set of parameters;

processing, using the second model, first input corresponding to the first set of parameters and second input corresponding to a second context to generate an output of the second model; and updating the first model to perform inference using an updated set of parameters based on the output of the second model.

23. A non-transitory computer-readable medium comprising instructions that, when executed by one or more processors, cause the one or more processors to:

obtain a first model and a second model, wherein the first model is configured to perform inference based on a first set of parameters corresponding to a first context, and wherein the second model enables updating the first set of parameters;

process, using the second model, first input corresponding to the first set of parameters and second input corresponding to a second context to generate an output of the second model; and update the first model to perform inference using an updated set of parameters based on the output of the second model.

24. An apparatus comprising:

means for obtaining a first model and a second model, wherein the first model is configured to perform inference based on a first set of parameters corresponding to a first context, and wherein the second model enables updating the first set of parameters;

means for processing, using the second model, first input corresponding to the first set of parameters and second input corresponding to a second context to generate an output of the second model; and means for updating the first model to perform inference using an updated set of parameters based on the output of the second model.

* * * * *